(12) United States Patent
Newnam et al.

(10) Patent No.: US 11,681,491 B1
(45) Date of Patent: Jun. 20, 2023

(54) SYSTEMS AND METHODS FOR DESIGNING A THEATER ROOM

(71) Applicant: Audio Advice, Inc., Raleigh, NC (US)

(72) Inventors: Scott Gaither Newnam, Morrisville, NC (US); Leon Whitfield Shaw, Wake Forest, NC (US); Jonathan Daniel Stephens, Raleigh, NC (US); Heather Wray McMillen, Clayton, NC (US); Ryan Alexander Newnam, Morrisville, NC (US)

(73) Assignee: Audio Advice, Inc., Raleigh, NC (US)

( * ) Notice: Subject to any disclaimer, the term of this patent is extended or adjusted under 35 U.S.C. 154(b) by 0 days.

(21) Appl. No.: 17/971,933

(22) Filed: Oct. 24, 2022

Related U.S. Application Data

(63) Continuation-in-part of application No. 17/736,288, filed on May 4, 2022.

(51) Int. Cl.
G06F 3/0482 (2013.01)
G06F 3/16 (2006.01)
G06F 3/04847 (2022.01)

(52) U.S. Cl.
CPC ............ G06F 3/162 (2013.01); G06F 3/0482 (2013.01); G06F 3/04847 (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 2008/0195970 A1* | 8/2008 | Rechsteiner | G06F 16/4393 715/810 |
| 2012/0113224 A1* | 5/2012 | Nguyen | G06T 7/55 348/46 |
| 2012/0114151 A1* | 5/2012 | Nguyen | G06F 3/0482 381/303 |
| 2012/0114152 A1* | 5/2012 | Nguyen | G06F 3/0486 381/303 |
| 2012/0117502 A1* | 5/2012 | Nguyen | G06F 3/0482 715/769 |

(Continued)

OTHER PUBLICATIONS

Audio Advice, "Prior Art Description", Jul. 6, 2022, pp. 1-7.

*Primary Examiner* — Daniel Rodriguez
(74) *Attorney, Agent, or Firm* — Coats & Bennett, PLLC

(57) ABSTRACT

Systems and methods of generating an interactive graphical user interface that represents a room for viewing on a user device. The aspects include: receiving from the user device inputs regarding speakers and a seat arrangement with a primary seat; determining a first arrangement of the speakers at a primary seat configuration that provides for a higher level of audio at the primary seat than at a remainder of the seats; determining a second arrangement of the speakers at an optimizer configuration that provides for the audio to achieve a highest average level across the seats; receiving from the user device an audio selection input of a desired audio configuration for the room; determining selected positions for the speakers within the room based on the audio selection input; generating an interactive graphical user interface that represents the room and comprises the speakers at the selected positions and the seat arrangement; and outputting the graphical user interface to a display of a user device.

19 Claims, 31 Drawing Sheets

(56) References Cited

U.S. PATENT DOCUMENTS

| | | | |
|---|---|---|---|
| 2015/0078580 A1* | 3/2015 | Schwerdtfeger | H04R 1/323 381/86 |
| 2015/0149943 A1* | 5/2015 | Nguyen | H04S 7/301 715/769 |
| 2015/0264502 A1* | 9/2015 | Aoki | H04S 5/005 381/17 |
| 2016/0309258 A1* | 10/2016 | Hiscock | G01S 5/30 |
| 2018/0063640 A1* | 3/2018 | Lee | H04R 29/002 |
| 2018/0181365 A1* | 6/2018 | Winton | H05B 47/115 |
| 2019/0335286 A1* | 10/2019 | Suenaga | H04R 5/04 |
| 2021/0105563 A1* | 4/2021 | Marten | H04N 21/439 |
| 2021/0311688 A1* | 10/2021 | Isselhardt | G06F 30/12 |
| 2022/0357834 A1* | 11/2022 | Saha | H04R 27/00 |

\* cited by examiner

| Number of rows | Primary row | Length - Position of sides | Height - Position of sides | Position: Rears/fronts | Position: Wides | Pairs of ceil. spk. | α Degrees forward | α Degrees rear | θ Degrees to side | Wall constraints | Seat constraints | Notes |
|---|---|---|---|---|---|---|---|---|---|---|---|---|
| 1 | 1 | Main less 6" | 50" over MLP riser | Same as current | One calc | 1 |  |  | 40 | Yes | No |  |
|  |  | Main less 6" | 50" over MLP riser | Same as current | One calc | 2 | 10 | 40 | 40 | Yes | No | Because angles are the same, ceil. sp. will be same distance forward and to the side |
|  |  | Main less 6" | 50" over MLP riser | Same as current | One calc | 3 | 45 | 45 | 40 | Yes | No | Middle ceil. sp. will be midpoint of front and back |
| 2 | 1 | Main less 6" | 50" over MLP riser | Same as current | One calc | 1 |  |  | 40 | Yes | No |  |
|  |  | Main less 6" | 50" over MLP riser | Same as current | One calc | 2 | 40 | 45 | 40 | Yes | No | We are shifting the ceil. sp. slightly backward to better cover rows |
|  |  | Main less 6" | 50" over MLP riser | Same as current | One calc | 3 | 45 | 45 | 40 | Yes | No | Middle ceil. sp. will be midpoint of front and back |
|  | 2 | Main less 6" | 50" over MLP riser | Same as current | One calc | 1 |  |  | 40 | Yes | No |  |
|  |  | Main less 6" | 50" over MLP riser | Same as current | One calc | 2 | 45 | 40 | 40 | Yes | No | We are shifting the ceil. sp. slightly forward to better cover rows |
|  |  | Main less 6" | 50" over MLP riser | Same as current | One calc | 3 | 45 | 45 | 40 | Yes | No | Middle ceil. sp. will be midpoint of front and back |
| 3 | 1 | Main less 6" | 50" over MLP riser | Same as current | One calc | 1 |  |  | 40 | Yes | No |  |
|  |  | Main less 6" | 50" over MLP riser | Same as current | One calc | 2 | 40 | 45 | 40 | Yes | No | We are shifting the ceil. sp. a little more backward to better cover rows |
|  |  | Main less 6" | 50" over MLP riser | Same as current | One calc | 3 | 40 | 45 | 40 | Yes | No | Middle ceil. sp. will be midpoint of front and back |

FIG. 19A

| Number of rows | Primary row | Length Position of sides | Height Position of sides | Position: Rears/fronts | Position: Wides | Pairs of ceil. spk. | α Degrees forward | α Degrees rear | θ Degrees to side | Wall constraints | Seat constraints | Notes |
|---|---|---|---|---|---|---|---|---|---|---|---|---|
| 2 | | Main less 6" | 50" over MLP riser | Same as current | One calc | 1 | 10 | | 40 | Yes | No | |
| | | Main less 6" | 50" over MLP riser | Same as current | One calc | 2 | 45 | 45 | 40 | Yes | No | We are widening the ceil. sp. to provide ideal for center row |
| | | Main less 6" | 50" over MLP riser | Same as current | One calc | 3 | 45 | 45 | 40 | Yes | No | Middle ceil. sp. will be midpoint of front and back |
| 3 | | Main less 6" | 50" over MLP riser | Same as current | One calc | 1 | 10 | | 40 | Yes | No | |
| | | Main less 6" | 50" over MLP riser | Same as current | One calc | 2 | 45 | 40 | 40 | Yes | No | We are shifting the ceil. sp. a little more forward to better cover rows |
| | | Main less 6" | 50" over MLP riser | Same as current | One calc | 3 | 45 | 40 | 40 | Yes | No | Middle ceil. sp. will be midpoint of front and back |

FIG. 19B

| Number of rows | Primary row | Length: Position of sides | Height: Position of sides | Position: Rears/fronts | Position: Wides | Pairs of ceil. spk. | α Degrees forward | α Degrees rear | θ Degrees to side | Wall constraints | Seat constraints | Notes |
|---|---|---|---|---|---|---|---|---|---|---|---|---|
| 1 | 1 | Main less 6" | 50" over avg flr height | Same as current | One calc | 1 | | | 40 | Yes | Yes | |
| | | Main less 6" | 50" over avg flr height | Same as current | One calc | 2 | 10 | 40 | 40 | Yes | Yes | Because angles are the same, ceil. sp. will be same distance forward and to the side |
| | | Main less 6" | 50" over avg flr height | Same as current | One calc | 3 | 40 | 40 | 40 | Yes | Yes | Middle ceil. sp. will be midpoint of front and back |
| 2 | 1 | Midpoint of rows | 50" over avg flr height | Same as current | One calc | 1 | 45 | 45 | 40 | Yes | Yes | |
| | | Midpoint of rows | 50" over avg flr height | Same as current | One calc | 2 | 10 | | 40 | Yes | Yes | We are shifting the ceil. sp. backward to better cover rows |
| | | Midpoint of rows | 50" over avg flr height | Same as current | One calc | 3 | 35 | 45 | 40 | Yes | Yes | Middle ceil. sp. will be midpoint of front and back |
| | 2 | Midpoint of rows | 50" over avg flr height | Same as current | One calc | 1 | 35 | 45 | | Yes | Yes | |
| | | Midpoint of rows | 50" over avg flr height | Same as current | One calc | 2 | 10 | | 40 | Yes | Yes | We are shifting the ceil. sp. forward to better cover rows |
| | | Midpoint of rows | 50" over avg flr height | Same as current | One calc | 3 | 45 | 35 | 40 | Yes | Yes | Middle ceil. sp. will be midpoint of front and back |
| 3 | 1 | Center row less 6" | 50" over avg flr height | Same as current | One calc | 1 | 45 | 35 | | Yes | Yes | |
| | | Center row less 6" | 50" over avg flr height | Same as current | One calc | 2 | 10 | 50 | 40 | Yes | Yes | We are shifting the ceil. sp. backward to better cover rows |
| | | Center row less 6" | 50" over avg flr height | Same as current | One calc | 3 | 35 | 50 | 40 | Yes | Yes | Middle ceil. sp. will be midpoint of front and back |
| | | | | | | | 35 | | 40 | | | |

FIG. 20A

| Number of rows | Primary row | Length: Position of sides | Height: Position of sides | Position: Rears/fronts | Position: Wides | Pairs of ceil. spk. | α Degrees forward | α Degrees rear | θ Degrees to side | Wall constraints | Seat constraints | Notes |
|---|---|---|---|---|---|---|---|---|---|---|---|---|
| | 2 | Center row less 6" | 50" over avg flr height | Same as current | One calc | 1 | 10 | | 40 | Yes | Yes | |
| | | Center row less 6" | 50" over avg flr height | Same as current | One calc | 2 | 45 | 45 | 40 | Yes | Yes | We are widening the ceil. sp. to provide ideal for center row |
| | | Center row less 6" | 50" over avg flr height | Same as current | One calc | 3 | 45 | 45 | 40 | Yes | Yes | Middle ceil. sp. will be midpoint of front and back |
| | 3 | Center row less 6" | 50" over avg flr height | Same as current | One calc | 1 | 10 | | 40 | Yes | Yes | |
| | | Center row less 6" | 50" over avg flr height | Same as current | One calc | 2 | 50 | 35 | 40 | Yes | Yes | We are shifting the ceil. sp. forward to better cover rows |
| | | Center row less 6" | 50" over avg flr height | Same as current | One calc | 3 | 50 | 35 | 40 | Yes | Yes | Middle ceil. sp. will be midpoint of front and back |

FIG. 20B

SYSTEMS AND METHODS FOR DESIGNING A THEATER ROOM

RELATED APPLICATION

This application is a continuation-in-part application of application Ser. No. 17/736,288 filed May 4, 2022 which is herein incorporated by reference in its entirety.

TECHNOLOGICAL FIELD

The present disclosure relates generally to the design of a room and, more specifically, to design of a room that provides for generating a graphical user interface that represents a room and calculations for determining the placement of the various components within the room to enhance video and/or audio performance.

BACKGROUND

Various rooms are designed to provide viewers with a heightened audio and visual performance. An example includes rooms designed exclusively for a theatrical experience which is commonly referred to as theater rooms. Another example includes media rooms that are a more general space designed to watch sports, movies, and/or listening to music. The rooms can be designed to include a variety of different user-selected components including various speakers, display screens, seats, and projectors. An issue with designing a room is selecting the components and then positioning the components in the room. Often times a design is lacking because of the selection of the components and/or the placement of the components.

Design of a room can also include using various combinations of components at different locations in the room. For example, the design process can try different numbers and spacing of the seats, different screen sizes, different numbers and spacing of speakers, etc. In addition, components with different sizes and styles, as well as components from different manufacturers may be tried as part of the design. Changing the type, number, and/or position of components can be a time-consuming process during the design.

Another issue is that the room design is difficult to understand in the abstract. The design can be written on paper or verbally explained, but it is often difficult for a person to fully appreciate the design. A full understanding of the design may not be appreciated until the room is created and the components installed. Unfortunately, changing the design after installation can be expensive as components may need to be replaced and/or moved within the room.

Therefore, there is a need for a room design tool that facilitates the design process to evaluate different components and different spacing. The design tool may provide a room to deliver the experience intended by producers of the content, such as a movie or show that includes special effects wherein the audio signal moves around to room to match a visual experience.

SUMMARY

One aspect is directed to a method of generating an interactive graphical user interface that represents a room for viewing on a user device. The method comprises: receiving from the user device inputs regarding speakers and a seat arrangement with a primary seat; determining a first arrangement of the speakers at a primary seat configuration that provides for a higher level of audio at the primary seat than at a remainder of the seats; determining a second arrangement of the speakers at an optimizer configuration that provides for the audio to achieve a highest average level across the seats; receiving from the user device an audio selection input of a desired audio configuration for the room; determining selected positions for the speakers within the room based on the audio selection input; generating an interactive graphical user interface that represents the room and comprises the speakers at the selected positions and the seat arrangement; and outputting the graphical user interface to a display of a user device.

In another aspect, the method further comprises optimizing the audio at the primary seat in the primary seat configuration.

In another aspect, the method further comprises positioning side speakers a predetermined distance in front of the primary seat in the primary seat configuration.

In another aspect, the method further comprises determining a seat zone that extends around a perimeter of the seats and positioning the speakers outside of the seat zone in the optimized configuration.

In another aspect, the method further comprises receiving the user input comprising a hybrid configuration between the primary seat configuration and the optimizer configuration; determining the selected positions for the speakers within the room in a third arrangement of the speakers at the hybrid configuration with the hybrid configuration positioning the speakers between the primary seat configuration and the optimizer configuration; generating, within the user interface, the graphical user interface that comprises the room layout with the speakers at the selected positions corresponding to the hybrid configuration; and outputting the graphical user interface to a display of a user device.

In another aspect, the method further comprises interpolating between the primary seat configuration and the optimizer configuration and determining the selected positions for the speakers within the room in the third arrangement.

In another aspect, the method further comprises determining one or more of the speakers are out of specification at the selected positions; and causing the one or more speakers that are out of specification to be displayed in a different visual manner than a remainder of the speakers.

In another aspect, the graphical user interface that represents the room comprises: outer walls comprising a front wall, a rear wall, and lateral side walls; one or more rows of the seats; and a screen on the front wall.

In another aspect, the graphical user interface that represents the room comprises: one or more of the speakers on the front wall; one or more speakers on the rear wall; one or more of the speakers on the lateral side walls; and one or more of the speakers on a ceiling.

In another aspect, the method further comprises applying a wall constraint to the speakers and preventing the speakers from being positioned within a predetermined distance from a wall of the room.

One aspect is directed to a method of generating an interactive graphical user interface that represents a room for viewing on a user device. The method comprises: determining a first arrangement of speakers within the room that provides for a higher audio level at a primary seat than at a remainder of seats and with the first arrangement positioning the speakers at first positions; determining a second arrangement of the speakers that provides for the audio level to be distributed to achieve a highest average level across the seats with the seat arrangement comprising the primary seat and the remainder of seats and with the second arrangement positioning the speakers at second positions; receiving from the user device a hybrid audio selection input of a desired audio configuration for the room that comprises a combination of the first arrangement and the second arrangement; interpolating between the first positions and the second positions and determining a third arrangement of the speakers that positions the speakers at a hybrid position based on the hybrid audio selection input; generating, within the user interface, a room layout that represents the room and comprises the speakers at the third arrangement; and outputting the graphical user interface to a display of a user device.

In another aspect, the method further comprises in the second arrangement positioning the speakers outside of a seat zone that is defined by outer edges of the seat arrangement.

In another aspect, the method further comprises determining the first arrangement of the speakers within the room that provides for a highest audio level at the primary seat and lower audio levels at the remainder of seats.

In another aspect, the method further comprises determining the second arrangement of the speakers that provides for the audio to be highest at the primary seat.

In another aspect, the method further comprises positioning ceiling speakers farther away from the primary seat in the second arrangement than in the first arrangement.

In another aspect, the method further comprises determining one or more of the speakers are out of specification at the third arrangement, and causing the one or more speakers that are out of specification to be displayed in a different manner than a remainder of the speakers that are within the specification.

In another aspect, the graphical user interface that represents the room comprises: outer walls of the room comprising a front wall, a rear wall, and lateral side walls; one or more of the speakers on the front wall; one or more speakers on the rear wall; one or more of the speakers on the lateral side walls; one or more of the speakers on a ceiling; one or more rows of the seats; and a screen on the front wall.

One aspect is directed to a server configured to generate an interactive graphical user interface that represents a room that comprises a floor, a front wall, a back wall, a ceiling, and a screen mounted to a front wall. The server comprises: memory circuitry; and processing circuitry configured to: determine speakers for providing audio in the room; determine a seat arrangement that comprises a primary seat; determine a first arrangement of the speakers at a primary seat configuration that provides for a higher level of audio at the primary seat than at a remainder of the seats; determine a second arrangement of the speakers at an optimizer configuration that provides for the audio to be optimized to achieve the highest average level across the seats determine an audio selection input of a desired audio configuration for the room; determine selected positions for the speakers within the room based on the audio selection input; generate an interactive graphical user interface that represents the room and comprises the speakers at the selected positions and the seat arrangement; and output the graphical user interface to a display of a user device.

In another aspect, the processing circuitry is further configured to: determine one or more of the speakers are out of specification at the selected positions; and cause the one or more speakers that are out of specification to be displayed in a different visual manner than a remainder of the speakers.

The features, functions and advantages that have been discussed can be achieved independently in various aspects or may be combined in yet other aspects, further details of which can be seen with reference to the following description and the drawings.

BRIEF DESCRIPTION OF THE DRAWINGS

FIGS. 19A and 19B illustrate a chart having data for positioning speakers in an arrangement with a 100% primary seat configuration.

FIGS. 20A and 20B illustrate a chart having data for positioning speakers in an arrangement with a 100% optimizer configuration.

DETAILED DESCRIPTION

The present application is directed to systems and methods for displaying a graphical user interface that represents an arrangement of components in a room. Based on inputs from the user and/or default selections regarding one or more of the components, a visual representation of the room is generated and outputted for viewing on a display screen of a user device. The display facilitates a user in designing and selecting components for the room.

Figure 1:
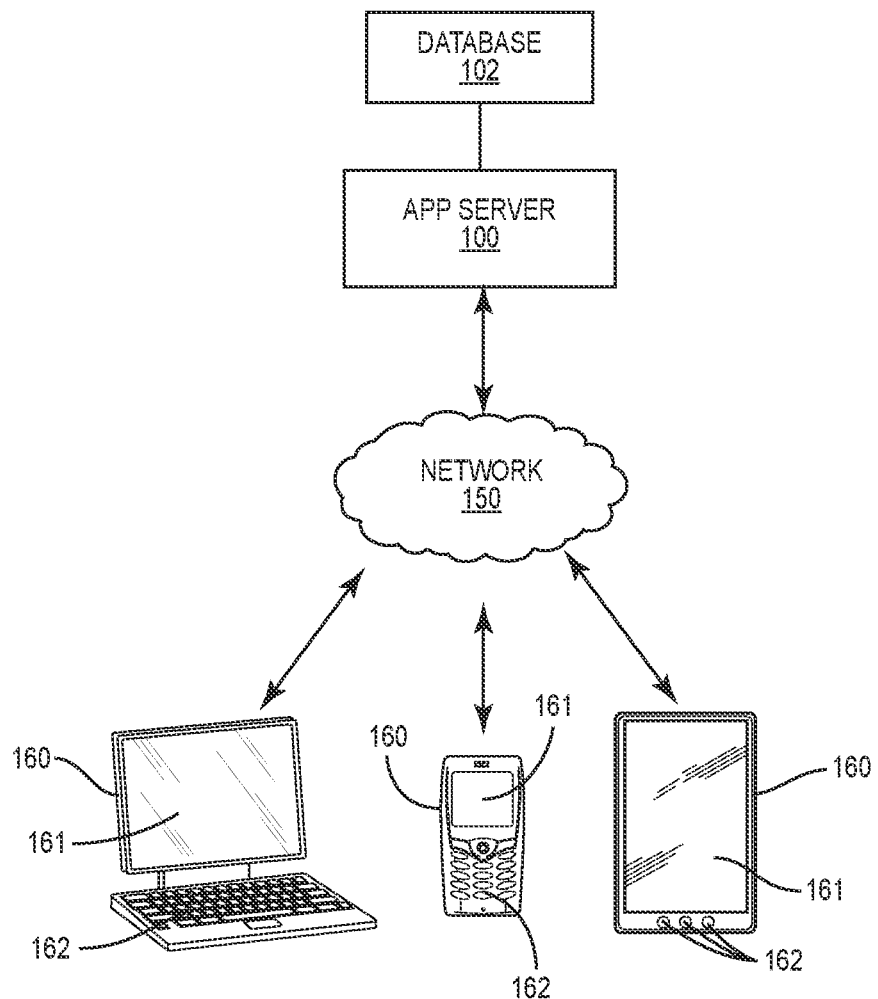
FIG. 1 is a schematic diagram of a communication network that includes a server operatively connected to user devices.

FIG. 1 illustrates an application server 100 configured to generate a graphical user interface that includes a visual representation of the room. The graphical user interface can then be displayed to a viewer on a display screen of a user device 160. The server 100 generates the room images of the interface based on one or more inputs received from one or more user devices 160 and/or default settings stored at the server 100. The server 100 includes a control program and rules and/or accesses the information from a database 102. The server 100 communicates with the user devices 160 through a wired or wireless communications network 150, such as a packet data network. The network 150 can include a public network such as the Internet, or a private network. The network 150 can also provide for communication through a mobile communication network (e.g., a WCDMA, LTE, or WiMAX network) and a Wireless Local Area Network (WLAN) that operates according to the 802.11 family of standards, which is commonly known as a WiFi interface.

In one example, the server 100 is configured to provide a web interface for access by the user devices 160. The server 100 is configured for the user to access information about the room design using a browser-based interface (e.g., Internet Explorer and Mozilla Firefox, Safari, Chrome) or an applications program interface (API). The browser-based interface can include a website through which the contents of the room design can be accessible. Although the website can be hosted by the server 100, it can also be hosted at another location accessible through the network 150.

Users can access the information at the server 100 through a variety of user devices 160. The user devices 160 can include but are not limited to laptop computers, personal computers, personal digital assistants, mobile computing/communication, tablet devices, and various other-like computing devices. Each of the users uses a respective user device 160 and accesses the server 100 through the network 150, or alternatively some other network. In one embodiment, one or more of the users can use his or her respective user device 160 to access the server 100 through a separate portal. Each user's portal can include a secure interface through which the user can access the information that is assigned to them.

Each user device 160 further includes a display 161 for displaying the room layout that is generated by the server 100. The user devices 160 further include one or more inputs 162 for the user to provide inputs to the server 100 regarding the room layout and various components.

Figure 2:
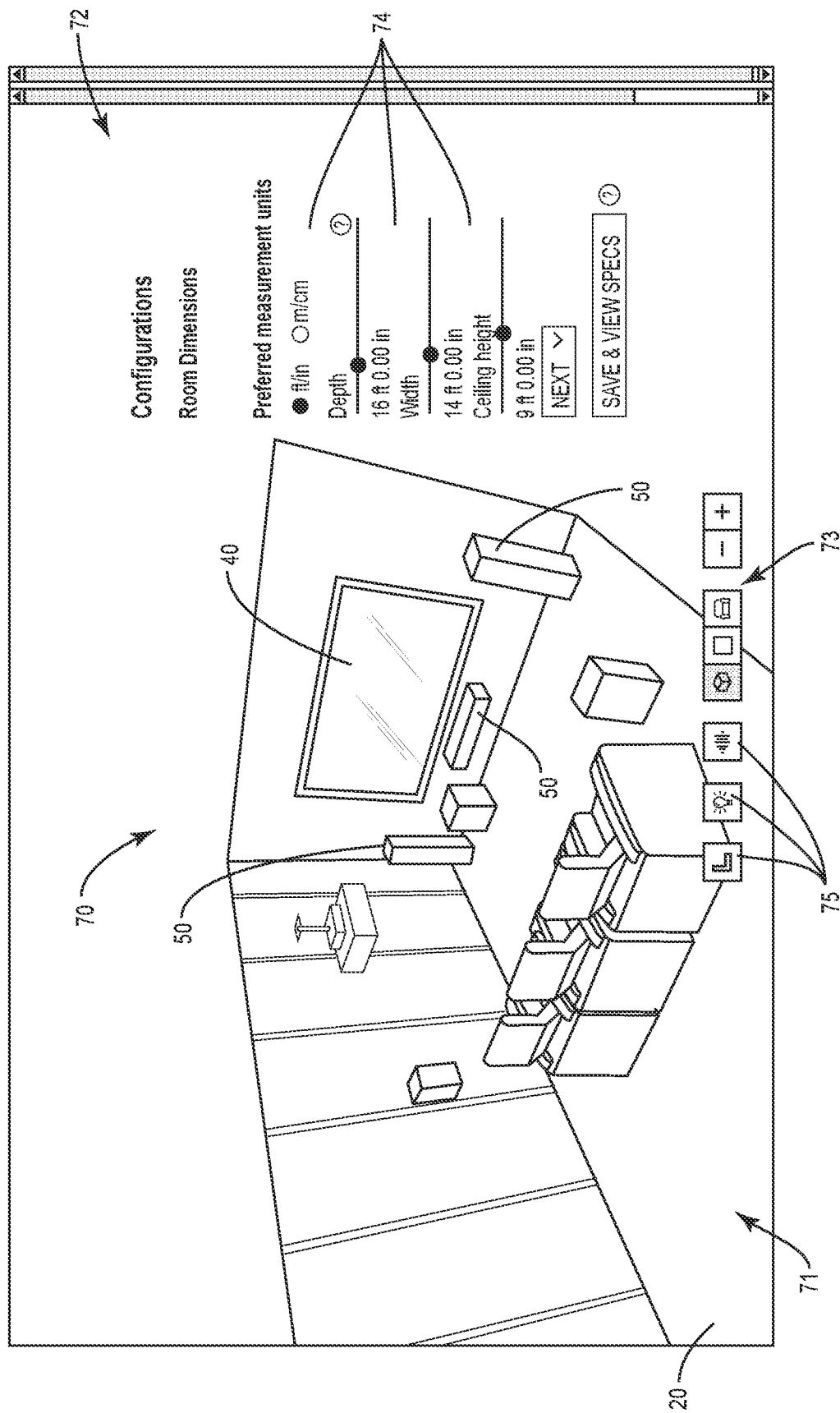
FIG. 2 is a display generated by a server with the display having a room section, an input section, and a control section.

FIG. 2 illustrates an example of a graphical user interface 70 of a room 20 that is generated by the server 100 for viewing on the display 161 of a user device 160. The graphical user interface 70 generally includes multiple different sections for displaying different information to the user. A room section 71 displays the layout of the room 20. An input section 72 includes one or more inputs 74 for a user to enter data for the server 100 to generate the room 20. A control section 73 provides one or more control settings 75 for the user to change how the room 20 is displayed in the room section 71.

Figure 3:
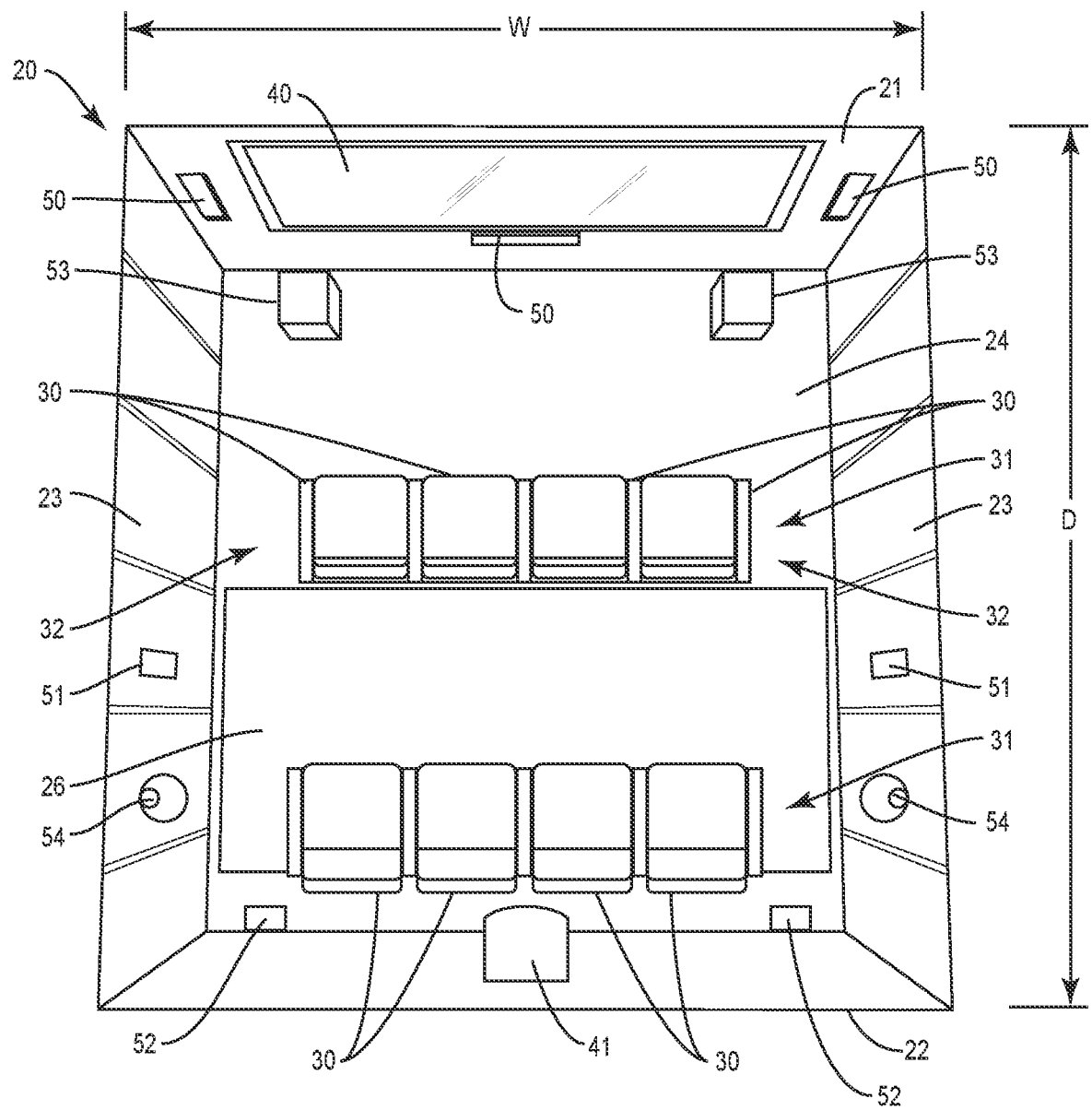
FIG. 3 is a top view of a room image generated by a server.

The room section 71 is a generated view of the room 20. As illustrated in FIG. 3, the generated room 20 includes outer walls that define the theater space and includes a front wall 21, a back wall 22, side walls 23, and a floor 24 (the ceiling 25 is omitted in FIG. 3 to provide a view into the interior). One or more of the outer walls may be transparent in one or more of the views. For example, the ceiling 25 is not illustrated in the perspective view of FIG. 2 or the top view of FIG. 3.

The room 20 includes dimensions that are defined by the outer walls. A depth D of the room 20 is defined between the front and back walls 21, 22. A width W of the room 20 is defined between the side walls 23. A height H of the room 20 is defined between the floor 24 and the ceiling 25. The room 20 further includes one or more seats 30. The seats 30 can be arranged in various configurations. One example includes rows 31 that are aligned in straight line. Another example includes rows 31 that are arranged in a curved configuration, L-shaped configuration, C-shaped, etc. The seats 30 can be sized to hold a single person, or two or more persons such as a couch or love seat. The room 20 also includes a screen 40 to display video/images, one or more speakers 50, 51, 52, 53, 54, and can include a projector 41.

The server 100 generates the room 20 that is displayed in the room section 71 based on the one or more inputs received from the user through the input section 72. The inputs 74 of the input section 72 can be configured for the user to select from a limited number of options, such as a slider bar with a discrete number of options. The inputs 74 can also include blank spaces that allow for the user to select the appropriate input. The input section 72 can also include an input for the user to input the preferred measurement units, such as feet/inches or meters/centimeters.

The input section 72 provides for input of one or more aspects about the layout of the room 20. One set of inputs is directed to the dimensions of the room 20 and include the depth D, width W, and height H. Another set of inputs is related to the seating in the room and includes the number of seats 30 per row 31, the rows 31 of seats 30, a primary seat 30, a distance from the screen 40 to the primary seat 30, a position of an aisle 32 along the seats 30 (e.g., right, left, multiple aisles), and a width of the aisle 32. The seating inputs can include the size of the seats 30 and/or the relatively spacing of the seats 31. Other inputs can include a height of a riser 26, and a depth of the riser 26.

The input section 72 also provides for one or more inputs related to the video setup. Input options can include but are not limited to type of display (e.g., flat panel TV, projector), an aspect ratio (e.g., 16:9, 2.4:1), a desired size of the screen 40, and an immersion level.

The input section 72 provides for one or more inputs directed to the audio setup for the room 20. Inputs include but are not limited to an includes a type of front speakers 50 (e.g., in wall, box), type of side speakers 51 (e.g., in wall, box, none), type of rear speakers 52 (e.g., in wall, box, none), number of subwoofers 53 (e.g., one, two), and number of ceiling speakers 54 (e.g., two, four, six).

In one example, the server 100 requires an input for each of the queried inputs 74. In other examples, the server 100 generates the room 20 based on the inputs 74 that are received. The server 100 uses predetermined values for missing inputs to generate the room 20.

The control section 73 includes one or more control settings 75 for the user to see different aspects generated by the server 100. One control setting 75 displays of one or more room dimensions, such as a width of a row 31 of seat 32 or the dimensions of the screen 40. Another control setting 75 sets the illumination level of the room 20 (e.g., full lights, no lights). A control setting 75 displays a sound envelope that is emitted from one or more of the speakers 50, 51, 52, 53, 54. The various control settings 75 can be displayed individually or in combination with one or more other settings. The control settings 75 can also provide for generating the room 20 from different views, including a perspective view (FIG. 2), a top view (FIG. 3), and a view from the primary seat 30. Control settings 75 can also include different zoom levels.

Figure 4:
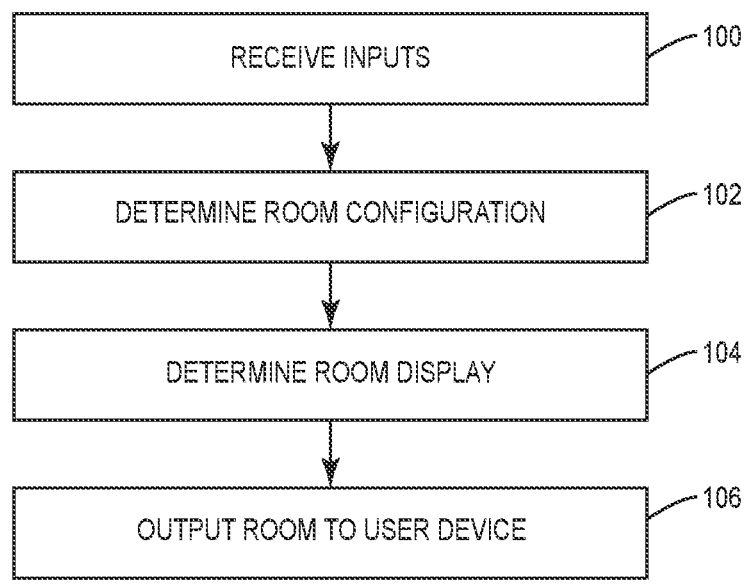
FIG. 4 is a flowchart diagram of a method of generating a graphical user interface that includes a representation of a room.

FIG. 4 illustrates a method of generating the graphical user interface that includes a room 20 for display on a user device 160. The server 100 receives inputs from the user regarding aspects of the room 20 (block 100). The server 100 determines aspects of the room 20 based on the inputs (block 102). The server 100 determines the image of the room 20 (block 104) and outputs the interface to the user device 160 (block 106).

Figure 5:
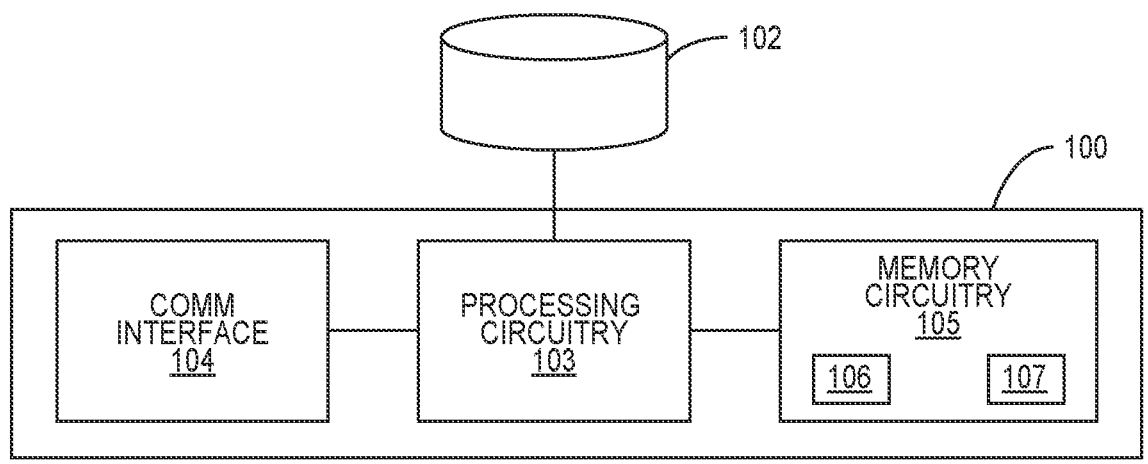
FIG. 5 is a schematic diagram of a server.

FIG. 5 illustrates a server 100 configured to calculate the room 20 and generate the corresponding images. The server 100 includes processing circuitry 103 that includes one or more microprocessors, microcontrollers, Application Specific Integrated Circuits (ASICs), or the like, configured with appropriate software and/or firmware. A computer readable storage medium (shown as memory circuitry 105) stores data and computer readable program code 106 that configures the processing circuitry 103 to implement the generation techniques. Memory circuitry 105 is a non-transitory computer readable medium and may include various memory devices such as random access memory, read-only memory, and flash memory. Communications interface 104 includes communications circuitry that connects the server 100 to the network 150. Database 102 stores information accessed by the processing circuitry 103 to generate the room 20. The database 102 is stored in a non-transitory computer readable storage medium (e.g., an electronic, magnetic, optical, electromagnetic, or semiconductor system-based storage device). The database 102 can be local or remote relative to the server 100. In one example, the server 100 does not include a database 102 and uses just data stored at the memory circuitry 105.

A rule set 107 is further stored in one or both of the memory circuitry 105 and database 102. The rule set 107 covers the dimensional aspects of the room 20 and the spacing between components. The rule set 107 can include one or more of a minimum spacing between components, a maximum spacing between components, and an optimal spacing between components. Examples of rules from the rule set include but are not limited to: the distance between the primary seat 30 and the screen 40; the distance between the front speakers 50, side speakers 51, and rear speakers 52; a distance between the projector 41 and the screen 40. In one example, the rule set 107 is a set of algorithms used by the processing circuitry 103 based on one or more of the room dimensions and components. In another example, the rule set 107 is provided from one or more of the manufacturers of the components and provide for audio and/or visual effects for the room 20.

The server 100 is configured to calculate the placement of the components within the room 20 to provide for one or more enhanced video and audio aspects. Calculations include sightline calculations for one or more of the seats 30 to provide for an unobstructed view of the screen 40. One sightline calculation includes a height of the screen 40 above the floor 24 to provide for sightlines for each of the seats 30. In one example with a single row 31 of seats 30, the bottom edge of the screen 40 is positioned thirty (30) inches above the floor 24.

Figure 6A:
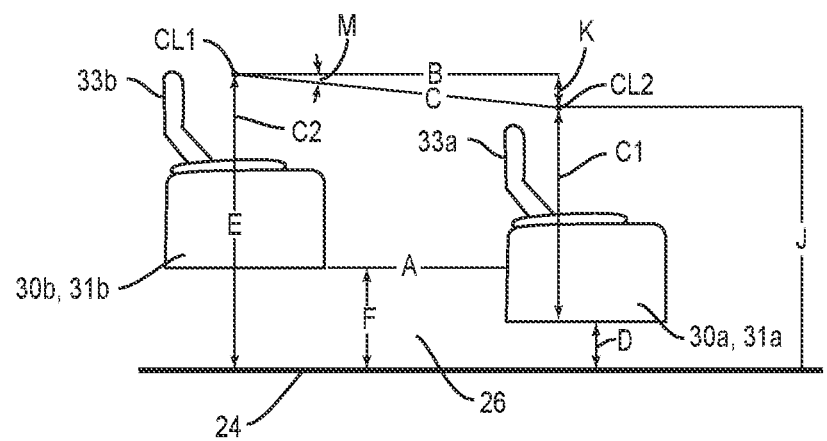
FIGS. 6A and 6B are schematic side views of dimensions and calculated values for sightline calculations.
Figure 6B:
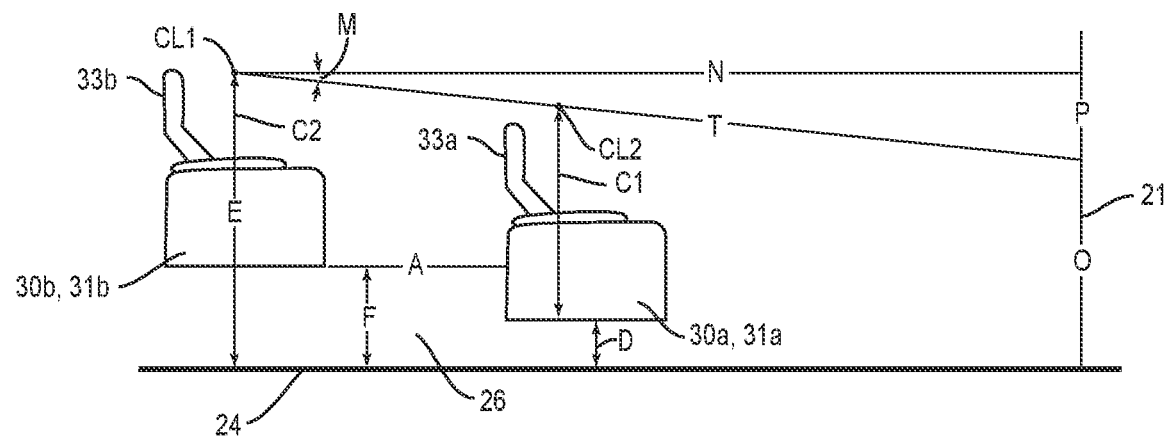

For rooms 20 with multiple rows 31, the server 100 calculates the sightlines using the rear two rows 31 (i.e., the two rows closest to the back wall 22). FIGS. 6A and 6B illustrates an example of calculations performed by the server 100 to calculate the sightlines for a room 20. These calculations include the following inputs from the user:

Rows of Seats
Riser Height
Riser Depth (A)
Primary Row
Primary Viewing Distance (d)

FIG. 6A illustrates a schematic diagram of the back two rows 31a, 31b of seats 30a, 30b in the room 20. Each row 31a, 31b can have various numbers of seats 30a, 30b based on an input from the user. The calculations for the sightlines are based on the position of the rear-most viewing seat relative to the position of the one or more seats in front. The seats 30 in the rows 31 can be aligned at various arrangements. In one example, each of the seats 30a, 30b in the row 31a, 31b are aligned an equal distance from the front wall 21. In another example, the seats 30 in a row 31 are different distances away from the front wall 21, such as in a rounded or curved seat arrangement, or a seat arrangement with an L-shaped row 31.

For each of the seats 30a, 30b, an expected position of a viewer seated in the seat is calculated. The server 100 calculates a position of the viewer's head while seated and establishes the position as a centerline for the seats 30a, 30b. Seat 30a in the front row 31a has a calculated centerline C1 and seat 30b of the second row 31b has a centerline C2. The position of the centerlines C1, C2 within the seats 30a, 30b can be the same or can be different. In one example, the server 100 calculates the centerlines C1, C2 based on a distance from a back edge of the seats 30a, 30b. In one example, the centerline C1 is calculated as being twelve (12) inches from the back edge 33a. Centerline C2 is calculated as being sixteen (16) inches from the back edge 33b. In one example, the dimensions of the seats 30a, 30b are input by the user. In another example, the dimensions are estimated based on a predetermined size for seats 30.

The sightline calculations are based on the available information for the server 100. This includes user input and/or predetermined data stored at the server 100. Based on this information, the server 100 calculates the following dimensions as shown in FIG. 6A:

$$B = \text{Riser depth}(A) - 4 \quad \text{(Eq. 1)}$$

$$D = (\text{rows} - 2) \times \text{riser height} \quad \text{(Eq. 3)}$$

$$F = (\text{rows} - 1) \times \text{riser height} \quad \text{(Eq. 2)}$$

$$E = F + 43 \quad \text{(Eq. 4)}$$

$$J = D + 48 \quad \text{(Eq. 5)}$$

These calculations include a determination of a first control location CL1 which is where a viewer's eyes are located when seated in seat 30b. Point CL1 is calculated as being the distance E above the floor 24. In one example, the value 43 used when calculating E is the expected eye height of a user that is seated in the seat 30. The calculations also include a determination of a second control location CL2 which is a top of a viewer's head that is seated in seat 30a. CL2 is a distance J above the floor which accounts for any riser, an expected height of a viewer seated in seat 30a, and a hedge amount. In one example, the expected height is forty-six (46) inches and the hedge amount is forty-eight (48) inches. The position of point SH is relevant to the sightline of the viewer seated in the back row 31b.

Additional sightline calculations are generated by the server as illustrated in FIGS. 6A and 6B:

$$K = E - J \quad \text{(Eq. 6)}$$

$$N = ((\#rows - primary\ row) \times riser\ depth) + primary\ viewing\ distance \quad \text{(Eq. 7)}$$

$$C = \text{square root}(B^2 + K^2) \quad \text{(Eq. 8)}$$

$$M = \arcsin K/C \quad \text{(Eq. 9)}$$

$$T = N/\cosine M \quad \text{(Eq. 10)}$$

$$P = \text{square root}(T^2 - N^2) \quad \text{(Eq. 11)}$$

$$O = E - P \quad \text{(Eq. 12)}$$

The sightline calculations described above and illustrated in FIGS. 6A and 6B are calculated to provide unobstructed views of the screen 40 by viewers seated in each of the seats 30. The calculations generated the distance the bottom of the screen 40 is positioned above the floor 24.

N is a calculation of the distance from the screen 21 to the eyes of the farthest back viewer. This allows for the calculation of the value M which is the calculated viewing angle of the back viewer to see over the other rows 31 and viewers. The calculation of N includes the primary row to be input by the user. For example, in a room 20 which three rows 31 and the second row is the primary viewing position, the calculation uses the distance to the primary viewing row and adds the riser depth to calculate the distance to the viewer of the farthest back seat. In an example with three rows and the back row input as the primary viewing position, the calculation results in N being equal to the primary viewing distance.

Example 1: The sightline calculations performed by the server 100 use the following inputs from the user (inches are used for units of measurements in this example):

Riser depth=78 inches
Riser height=12 inches
Rows=2
Viewing distance to primary seats=271 inches
Primary row=2

| | |
|---|---|
| $78-4=74$ | B: |
| $(2-1) \times 12 = 12$ | F: |
| $(2-2) \times 12 = 0$ | D: |
| $12+43=55$ | E: |
| $0+48=48$ | J: |
| $55-48=7$ | K: |
| $(2-2) \times 78 + 271 = 271$ | N: |
| sq rt $(74^2 + 7^2) = 74.33$ | C: |
| arcsin $7/74.33 = 0.094$ | M: |
| $271/\cosine 0.094 = 272.21$ | T: |
| sq rt $(272.21^2 - 271^2) = 25.64$ | P: |
| $55 - 25.64 = 29.36$ | Q: |

In this example, the bottom edge of the screen 40 should be placed about twenty-nine (29) inches above the floor 24.

In one example, the screen 40 includes a frame. The server 100 further computes the size of the frame and adjusts the distance above the floor 24.

Figure 6C:
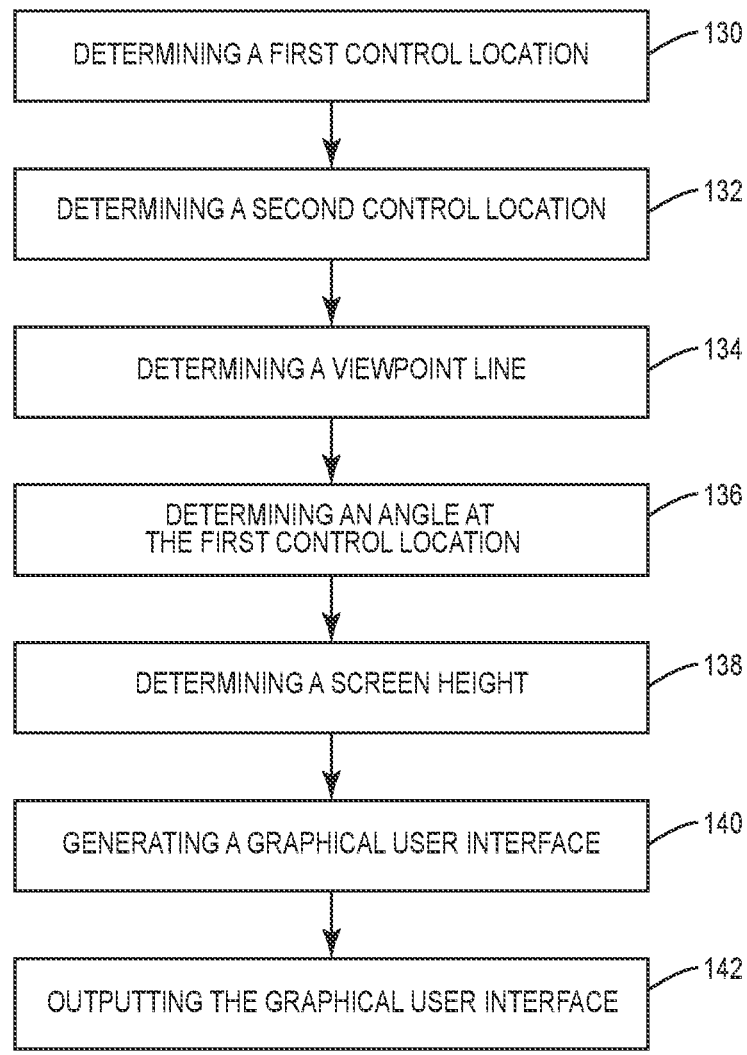
FIG. 6C is a flowchart diagram of a method of generating an of an interactive graphical user interface

FIG. 6C illustrates a flowchart of a method of generating an of an interactive graphical user interface that represents a room 20 for viewing on a user device 160. The method includes determining a first control location CL1 (block 130). The first control location CL1 defines an eye height of a back viewer sitting in a back seat 30b. The eye height is calculated as being a first distance above the floor 24.

A second control location CL2 is determined that is above a head of a front viewer sitting in a front seat 30a (block 132). The second control location CL2 is a combination of an amount the head of the front viewer is above the floor 24 when sitting in the front seat 30a plus a safety variable distance.

A viewpoint line is determined that extends between the first control location CL1 and the screen 40 (block 134). The viewpoint line is perpendicular to the screen 40. An angle is determined at the first control location CL1 (block 136). The angle is formed between the viewpoint line and a straight line that extends between the first control location CL1 and the second control location CL2. A screen height is determined that is a distance between the floor 24 and a bottom edge of the screen 40 (block 138). The screen height is determined based on the angle and a distance between the first control location CL1 and the screen 40. An interactive graphical user interface 70 is generated (block 140). The interface 70 represents the room 20 and includes the back seat 30b, the front seat 30a, and the screen 40 mounted to the front wall 21 with a bottom of the screen 40 positioned above the floor 24 by the screen height. The graphical user interface 70 is output to a display 161 of a user device 160 (block 142).

The server 100 also calculates an immersion level for a viewer seated at a primary seat 30. The immersion level is the extent the screen 40 fills the viewer's field of vision. In one example, an average immersion level fills a moderate level of a viewer's field of vision. A higher immersion level fills the majority of a viewer's field of vision. The server 100 calculates different immersion levels based on the horizontal viewing angle taken from a point P at the primary seat 30. In the event the user does not specify the primary seat P, the server 100 will use a default seat 30. In one example, the primary seat P is the middle seat 30 of the back row 31. In another example, the primary seat is the middle seat 30 of the front row 31. In another example with an even number of seats in the primary row 31, the primary position is a midpoint between the middle two seats 30 of the row 31.

Figure 7:
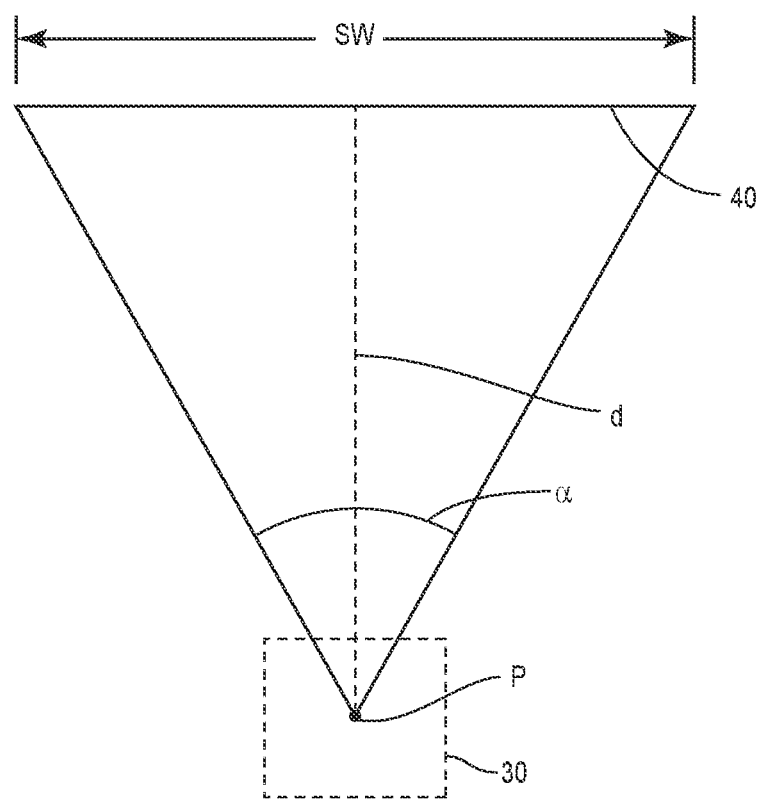
FIG. 7 is a schematic diagram of a horizontal viewing angle.

FIG. 7 schematically illustrates a horizontal viewing angle α for point P from a primary seat 30 that is a distance d away from the screen 40. The screen 40 includes a width sw. The viewing angle α is calculated as follows:

$$\text{viewing angle } \alpha = (\tan^{-1}(sw/2)/d) \times 2 \quad \text{(Eq 13)}$$

Example 2: A viewing angle for a screen with a width of 40 inches with a primary viewing point that is 144 inches away from the screen.

$$\text{Viewing angle } \alpha = (\tan^{-1}(40/2)/144) \times 2 = 26.5°$$

In one example, the server 100 stores immersion level ratings to grade the design of the room 20. The ratings are based on the horizontal viewing angle and can have different levels (e.g., low, average, high, extreme). Tables 1 and 2 illustrate examples of the rating for an immersion level based on the horizontal viewing angle for different types of screens 40.

TABLE 1

| (screen aspect ratio of 16:9) | | |
|---|---|---|
| Greater than | Equal to or less than | Rating |
| 0° | 28.4° | Level 1 (Low) |
| 28.4° | 38° | Level 2 (Average) |
| 38° | 41.4° | Level 3 (Higher) |
| 41.4° | 180° | Level 4 (Extreme) |

TABLE 2

| (screen aspect ratio of 2.4) | | |
|---|---|---|
| Greater than | Equal to or less than | Rating |
| 0° | 37° | Level 1 (Low) |
| 37° | 44.4° | Level 2 (Average) |
| 44.4° | 52.4° | Level 3 (Higher) |
| 52.4° | 180° | Level 4 (Extreme) |

In one example, the input by the user requires the horizontal viewing angle to meet at least a predetermined rating. For example, the server 100 will show an error message in the event the user input results in a horizontal viewing angle of Level 1. In another example, the server 100 calculates the horizontal viewing angle based on the user input and outputs the rating to the user informing them of the rating but does not provide an error message regardless of the calculated rating.

The server 100 also calculates specifications for one or more of the speakers including the front speakers 50, side speakers 51, rear speakers 52, subwoofer 53, and ceiling speakers 54. The speaker channels and type of speakers (e.g., model number, manufacturer) are input from the user. In one example, the server 100 stores default channels and speakers in the event no input is received from the user.

In one example as illustrated in FIG. 2, three front speakers 50 are included in the room 20. In one example, if the screen 40 is not acoustically transparent, the server 100 calculates the distance between the two outer front speakers 50 as equaling 1.04 times the distance d from the screen 40 to the primary seat 30 (i.e., 1.04×d). Regardless of the calculation, the distance between the two front speakers 50 is calculated as being not wider than the width W of the room 20 and not narrower than the screen width ws. If the screen 40 is acoustically transparent, the distance between the two outer front speakers 50 is constrained to no wider than the width of the screen ws and inside a frame of the screen 40.

The server 100 calculates the positioning of the side speakers 51. The side speakers 51 are positioned on the lateral side walls 23 equal distances away from the front wall 21. When there is a single row 31 of seats 30, the side speakers 51 are spaced away from the front wall 21 a distance that is six (6) inches less than the distance d between the point P on the primary seat 30 (i.e., placement=d−6). In a room 20 with two rows 31, the side speakers 51 are positioned equal distances between the two rows 31. In a room 20 with three rows 31, the speakers 51 are calculated as being positioned the same distance as the distance from the screen 40 to the center of the second row 31.

The server 100 can also calculate the positioning of the side speakers 51 using different calculations. If there is only one row 31 of seats 30, the side speakers 51 are positioned perpendicular to the main viewing position P. The side speakers 52 can also be moved forwards towards the front wall 21 six (6) inches. That is, the side speakers 51 are positioned 90 from the primary viewing position P (to the left and right) and forward 6" toward the front wall 21. This positioning that is slightly forward from the primary viewing position P provides for the speakers 51 to be slightly forward so that persons adjacent to a person in the primary point P does not block the sound from the speakers 51. In another example, instead of moving forward six (6) inches, the speakers 51 are moved forward 5°. In one specific example, the speakers 51 are placed at 85° instead of 90°. When there are two rows 31a, 31b, the side speakers 51 are positioned equidistant between the first row 31a and the second row 31b. This equal distancing enables both rows 31a, 31b to share equally in the side sound. When there are three rows 31a, 31b, 31c, the side speakers 51 are positioned perpendicular to the middle row 31b. This positioning provides for all three rows 31a, 31b, 31c to share the sound as best as possible.

The server 100 calculates the position of the side speakers 51 above the floor 24 as a predetermined value plus an average height of the risers 26. In one example, the server 100 calculates the height as fifty (50) inches plus the average height of the risers 26 (i.e., vertical distance=50+avg. riser height). In another example, the side speakers 51 are positioned at a fixed height above the riser 26 that is below them. For example, side speakers 51 at a second row 31 of seats 30 would be positioned fifty (50) inches above the riser 26 of the second row 31. Side speakers 51 next to the third row 31 would be positioned fifty (50) inches above the riser 26 of the third row 31.

Figure 8:
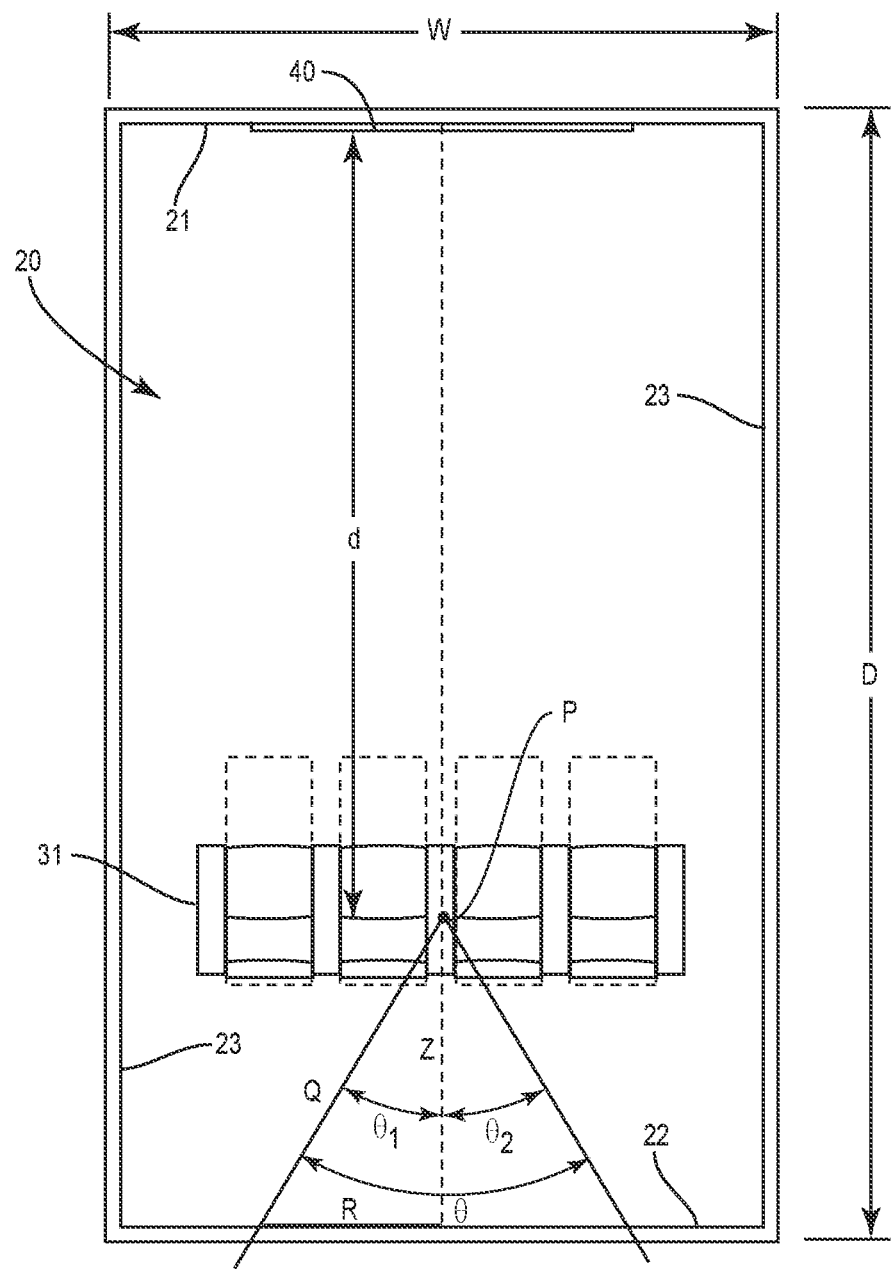
FIG. 8 is a top schematic diagram of placement of rear speakers for a room.

The rear speakers 52 are mounted at the back wall 22. The number of rear speakers 52 can vary depending upon the desired acoustic performance. FIG. 8 illustrates the calculations performed by the server 100 for placement of a pair of rear speakers 52. The calculations are based on user input that includes the depth D and width W of the room 20, and the primary distance d between the point P at the primary seat 30 and the screen 40. As illustrated in FIG. 8, the server 100 further receives user input regarding the angular range θ of the rear speakers 52 at point P. The angular range θ is defined by the combination of θ1 and θ2. In one example, each of θ1 and θ2 can be equal to equal predetermined values (e.g., 30°, 45°).

The server 100 calculates the following values:

Value Z is calculated as the distance between the back wall 22 and the primary viewing distance d.

$$Z = D - d \tag{Eq. 14}$$

Value Q is calculated as the distance along the angular range between the primary point P and the back wall 22. For this calculation, the angle θ1 is converted to radians.

$$Q = Z/\cosine\ \theta1 \tag{Eq. 15}$$

$$R = \text{sq.rt}\ Q^2 - Z^2 \tag{Eq. 16}$$

$$G = (W/2) - 12 \tag{Eq. 17}$$

The calculation for the distance between the rear speakers 52 is:

$$\text{If } R < 36, \text{distance} = 36; \tag{Eq. 18}$$

Otherwise, If R<G, distance=R; if R>G, distance=G

Example

The following inputs are received from the user (the units are in inches): Room depth (D)=180; Room width (W)=120;

Primary viewing distance (d)=120; the room layout includes side and rear speakers; the angle θ1 is 30° and θ is 30.

$Z=D-d$; $Z=180-120=60$
$θ1=30°$ which equates to 0.523
$Q=Z/\cosine θ1$; $Q=60/\cosine 0.523=69.28$
$R=$sq. rt $Q^2-Z^2$; $R=$sq rt $69.28^2-60^2=34.64$
$G=(W/2)-12$; $G=120/2-12=48$
Distance=36

The calculated amount is the distance between the two rear speakers 52. In one example, the two speakers 52 are centered along a centerline of the room 20 (i.e., the middle of the width W) with each of the speakers 52 an equal distance away from the centerline. In another example, the speakers 52 are centered along a position of the primary spot P, which may or may not be aligned along the centerline of the room.

The calculations for placement of the rear speakers 52 can be dependent upon one or more other components in the room 20. In one example, if the room 20 includes side speakers 51, then the rear speakers 52 are moved closer to the centerline of the room 20. For example, the rear speakers 52 are positioned 30 from the centerline in each direction (i.e., θ1 and θ2 are each 30°). This positioning of the rear speakers 52 provides a more immersive experience. If the room 20 does not include side speakers 51, then the rear speakers 52 are moved out wider (e.g., θ1 and θ2 are each 45°) to accommodate for the lack of side speakers 51. In one example, this positioning of the width based on the existence of the side speakers 52 is calculated regardless of any contradictory input. In another example, the user is able to over-ride the positioning and select the desire angular positions of the rear speakers 52.

The server 100 calculates the rear speakers 52 positioned a distance above the floor 24 an amount equal to a predetermined value plus a height for the risers 26. In one example, the server 100 calculates the distance as fifty (50) inches plus a sum of all the heights of the risers 26. This positions the rear speakers 52 at fifty (50) inches above the back row riser.

The server 100 also calculates the position of the ceiling speakers 54. Various numbers of ceiling speakers 54 can be incorporated into the room 20. In one example, the ceiling speakers 54 are Dolby Atmos speakers.

Figure 9:
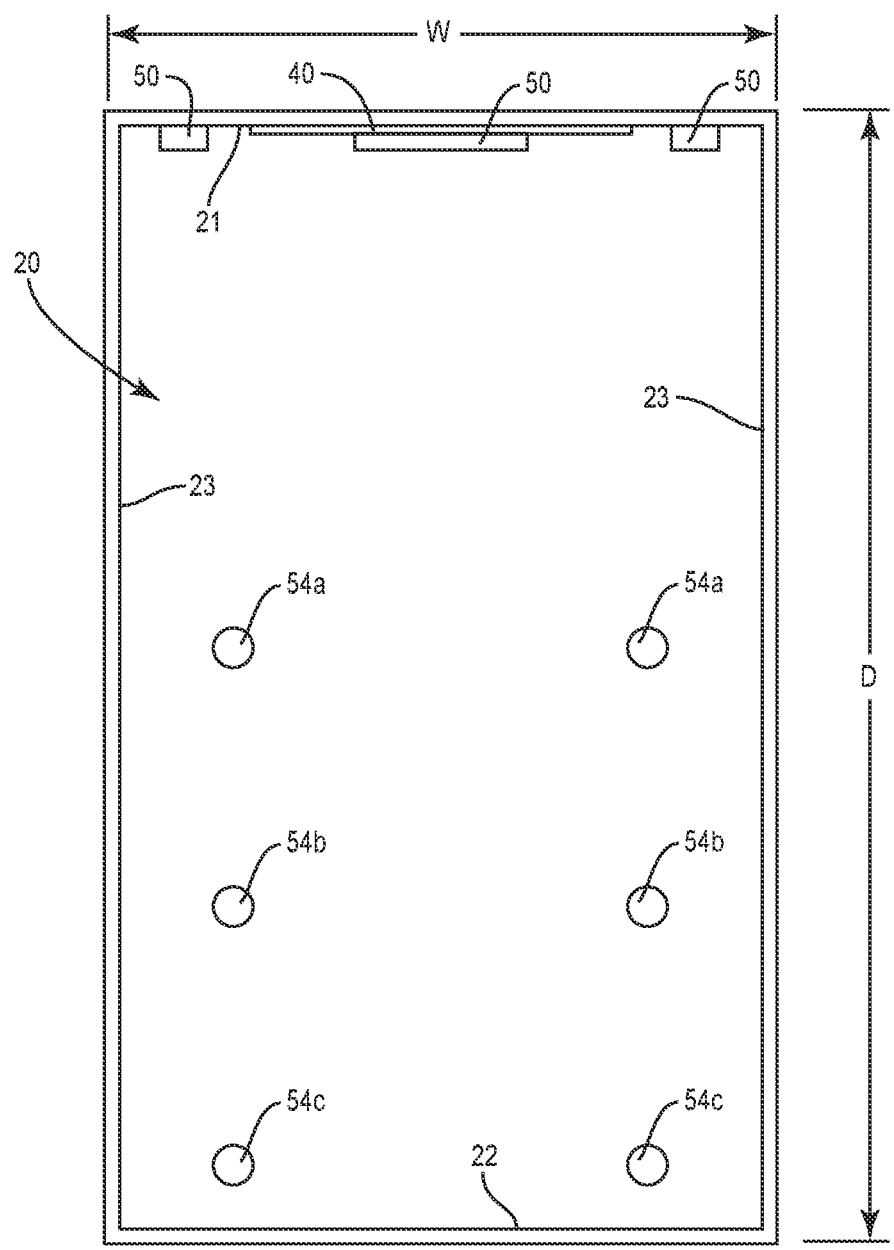
FIG. 9 is a top schematic diagram of placements for ceiling speakers within a room.

FIG. 9 illustrates an example in which the server 100 calculates the positioning of three pairs of ceiling speakers 54. As illustrated in FIG. 9, these include a first pair 54a that are closest to the front wall 21, a middle pair 54b, and a rear pair 54c. The number of ceiling speakers 54 in the room 20 is received from the user. In the event fewer ceiling speakers 54 are input from the user, the server 100 uses a limited number of the calculated positions. For example, if the user inputs just a single pair of ceiling speakers 54, the server 100 positions the single pair at 10° forward of the primary viewing position. If the user inputs two pairs of speakers 54, the server 100 uses the positioning for the front and rear pairs 54a, 54c.

The server 100 calculates the distance between each of the pairs 54 (e.g., 54a, 54b, 54c) across the width W of the room 20 to be the same as the distance between the two outer front speakers 50. In one example, the distance between the pair 54 is 1.04 the distance d measured between the screen 40 and the primary point P. The distance between the pair 54 is not wider than the width W of the room 20 or narrower than the distance between the left and right front speakers 50. When an acoustically transparent screen 40 is used the pair 54 can be as wide as the screen 40 but inside a frame that extends around the screen 40. In another example, the front speakers 54a are positioned in front of the first row 31a, the rear speakers 54c are positioned behind the rear row 31c. The distance across the width W of the room positions the rear speakers 54 outward beyond the seats 30 (i.e., left speakers 54 are positioned to the left of the seats 30 and the right speakers 54 are positioned to the right of the seats 30).

Figure 10:
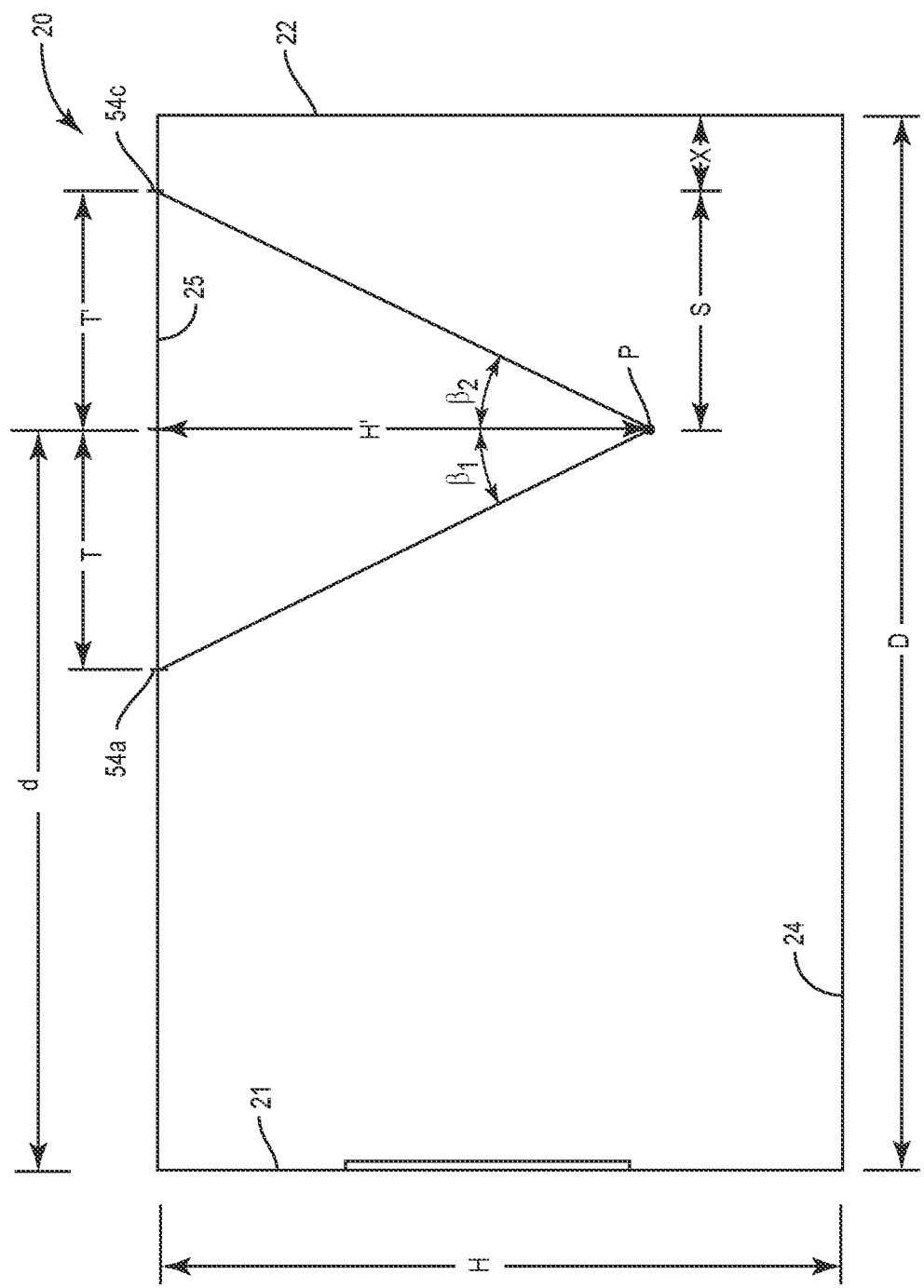
FIG. 10 is a side schematic diagram of placement of pairs of ceiling speakers in a room.

The server 100 also calculates the position of the ceiling speakers 54 along the depth D of the room 20. FIG. 10 illustrates an example that includes two pairs of speakers 54a, 54c. The speakers 54a, 54c are equally spaced apart about the primary point P that is a distance d from the front wall 21. A buffer X is set from the back wall 22. The calculations by the server 100 prevent the rear speakers 54c from being positioned within the buffer X. In one example, the buffer X represents a space in which the speakers 54c cannot be physically positioned due to the architecture of the room 20 and/or the house in which the room 20 is located.

A line H' extends between the ceiling and the point P. The line H' is perpendicular to the ceiling 25. The length of H' measured between the ceiling 25 and point P is the calculated as the height H of the room 20 less a predetermined amount. In one example, the predetermined amount is the distance CL1 which is the calculated position of the viewer's ears. In another example, predetermined distance is a percentage of the height H of the room (e.g., 0.25 (H), 0.4 (H)). In another example, the predetermined distance is forty-one (41) inches. In another example, the predetermined distance is the predetermined distance plus the height of the riser 26 at the primary point P.

The speakers 54a, 54c are equally spaced from the point P along the depth D. The first pair 54a is positioned at an angle β1 relative to the line H' that extends through the primary point P. The second pair 54c is positioned at an equal angle β2 relative to the line H'.

Figure 11:
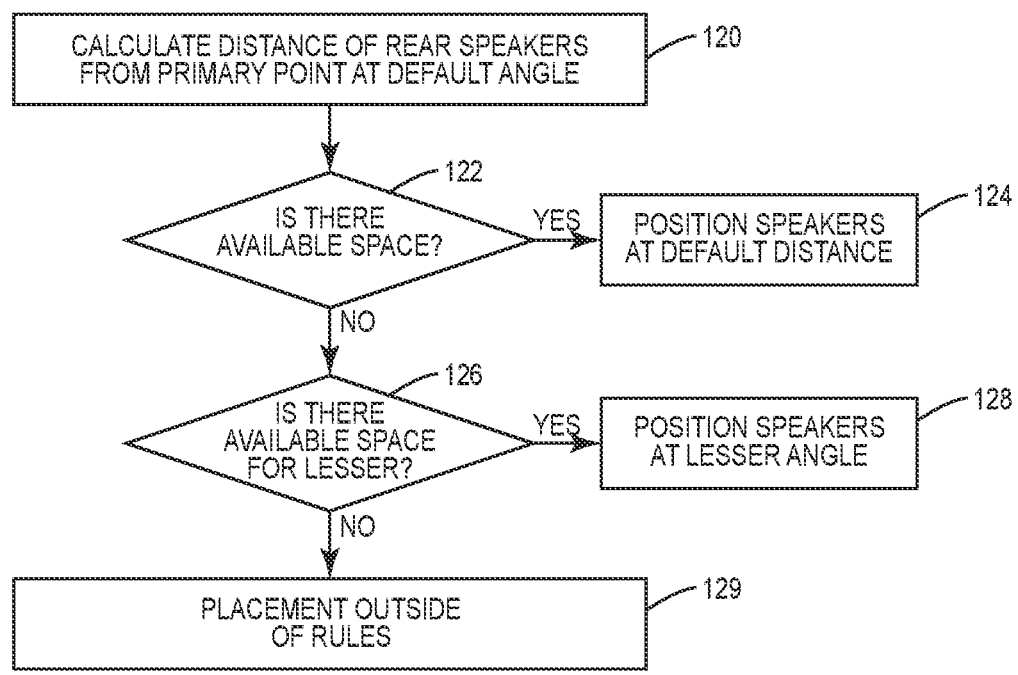
FIG. 11 is a flowchart diagram of a method of positioning rear speakers in a room.

FIG. 11 illustrates the calculations performed by the server 100 in placing the speakers 54a, 54c in the room 20. The server 100 calculations the distances T, T' for a default angular position (block 120). In one example, the default setting for each pair of speakers 54a, 54c is 45° (i.e., each of β1 and β2 are at 45). The server 100 calculates the position of the speakers 54a, 54c to be symmetrical about the primary point P.

The server 100 determines if there is adequate space in the room 20 for the default position (block 122). The default positioning is available when the distance S defined between the primary point P and the buffer zone X defined along the depth D is greater than the distance T' defined as the distance between the primary point P and the position of the speakers 54c. If the default positioning is available, the speakers 54a, 54c are set at this distance with the default angular positioning from the primary point P (block 124).

If there is not space for the default positioning, the server 100 calculates the distance for positioning the speakers at one or more lesser angular positions (block 126). This includes calculating the distances down to a predetermined minimum angular position at which the audio experience in the room is not adequate to what the sound engineers intended when producing the content. In one example, the predetermined minimum angular position is 30°. The server 100 positions the speakers 54a, 54c at the largest available angular position that is above the predetermined minimum (block 128). For example, the server 100 will position the speakers at an angle of 40° when the default angular position of 45° is not available, and the 40° is the largest angular position that positions the speakers 54c away from the buffer X.

If the server 100 calculates that there is not space available for the minimum distance, the server 100 provides an indication to the user (block 129). The indication may include an error message that prevents the placement of the speakers 54a, 54c. In another example, the user can input an acknowledgement of the error message and that the speakers 54a, 54c are positioned outside of a rule.

In one example, the front and rear speakers 54a, 54c are centered about the line H'. Each of the speakers 54a, 54c is positioned an equal distance away from the line H'. The server 100 can limit the angular range between the speakers 54a, 54c within a range of 60°-90° with each of β1 and β2 being between 30-45°.

Another example of placement of the ceiling speakers 54 is positioning the rear speakers 54c to be closer than the front speakers 54a. This can occur in one example when the rear row 31 of seats 30 get very close to the back wall 22. This close positioning contracts the rear ceiling speakers 54c to be closer to the seats 30 and positioned at the buffer area X but still have the front ceiling speakers 54a stay farther forward. The front speakers 54a are in front of the first row 31a of seats 30b and the rear speakers 54c are behind the last row 31c of seats 30c. The seats 30 may not be equidistant from the main viewing point but ensures that the various seats 30 get the proper audio experience.

Figure 12:
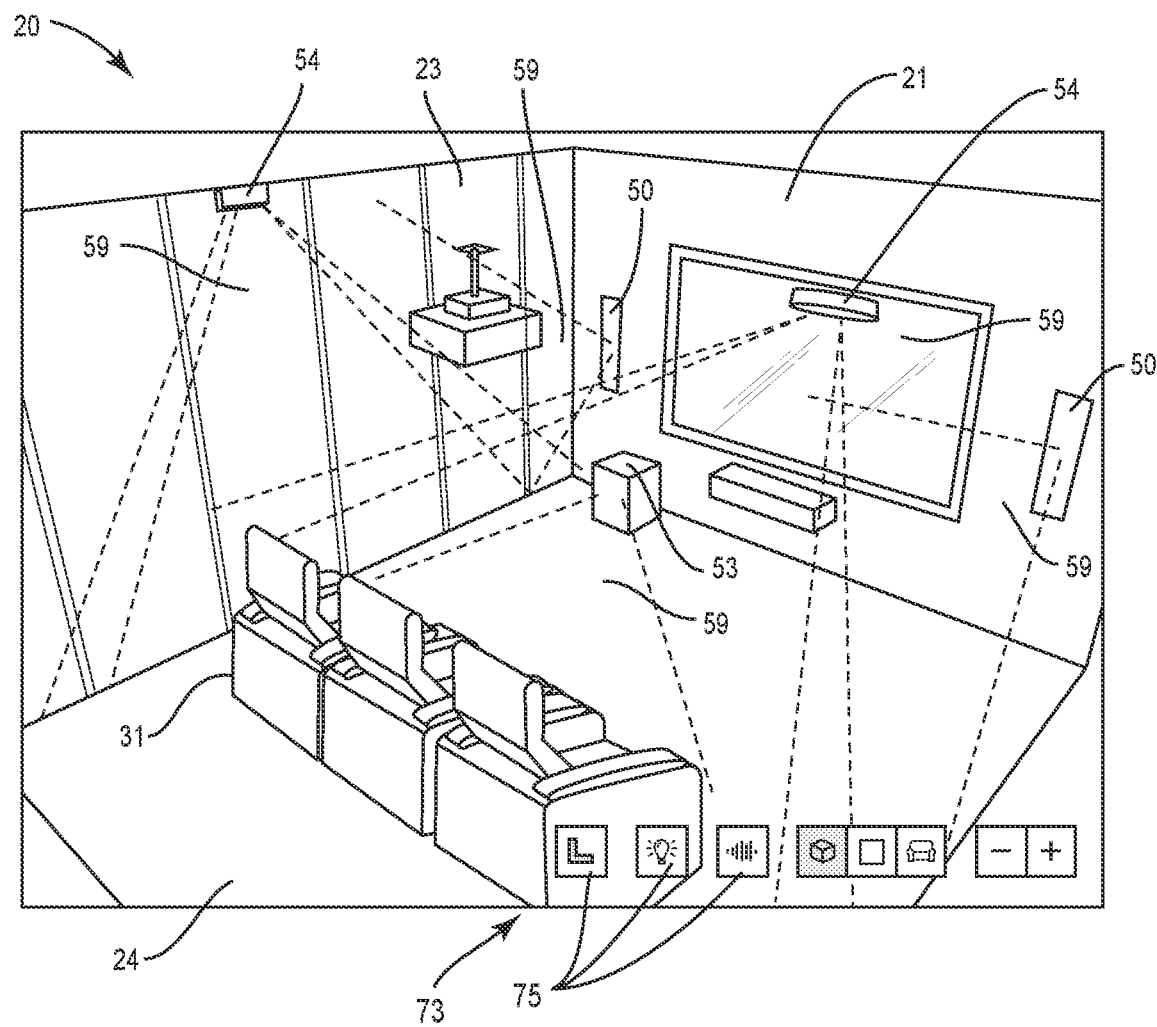
FIG. 12 is a perspective view of a room generated by a server with the room including sound dispersion envelopes.

The server 100 is further configured to generate sound envelopes 59 for one or more of the speakers 50, 51, 52, 53, 54. As illustrated in FIG. 12, the sound envelopes 59 visually illustrate the dispersion of the sound from the speaker and into the room 20. This visual representation can assist a user in creating the desired sound effects for the room 20. In one example, the sound dispersion is activated based on an input through a control input 75 on the control section 73 of the generated display. The user can toggle the sound dispersion setting on and off as desired. In one example, the settings provide for a sound envelope 59 to be displayed for each of the speakers in the room 20. Additionally or alternatively, the user is able to turn the sound envelope 59 on or off individually for each speaker in the room 20. This individual setting for each speaker provides for a user to see the sound of a single speaker. In another setting, the sets of speakers can be toggled on or off. For example, just the front speakers 50 are displayed with a sound envelope 59 with the other speakers not having a sound envelope 59. This provides for the user to visually see the effect of the set of specific speaker components.

For each of the various components in the design of the room 20, the server 100 can receive changes to one or more of the inputs. For example, the server 100 generates a display for a room 20 with three rows 31 of seats 30. After the room 20 is displayed by the user, the server 100 receives a change that includes just two rows 31. The server 100 recalculates the settings of the various components and generates an updated room 20 that can be displayed by the user. The one or more new inputs are entered by the user by toggling through one or more of the values shown in the input section 72 on the generated image. Additionally or alternatively, inputs can be entered by the user positioning a curser on the one or more components displayed in the room 20 and dragging the component to the new location.

Figure 13A:
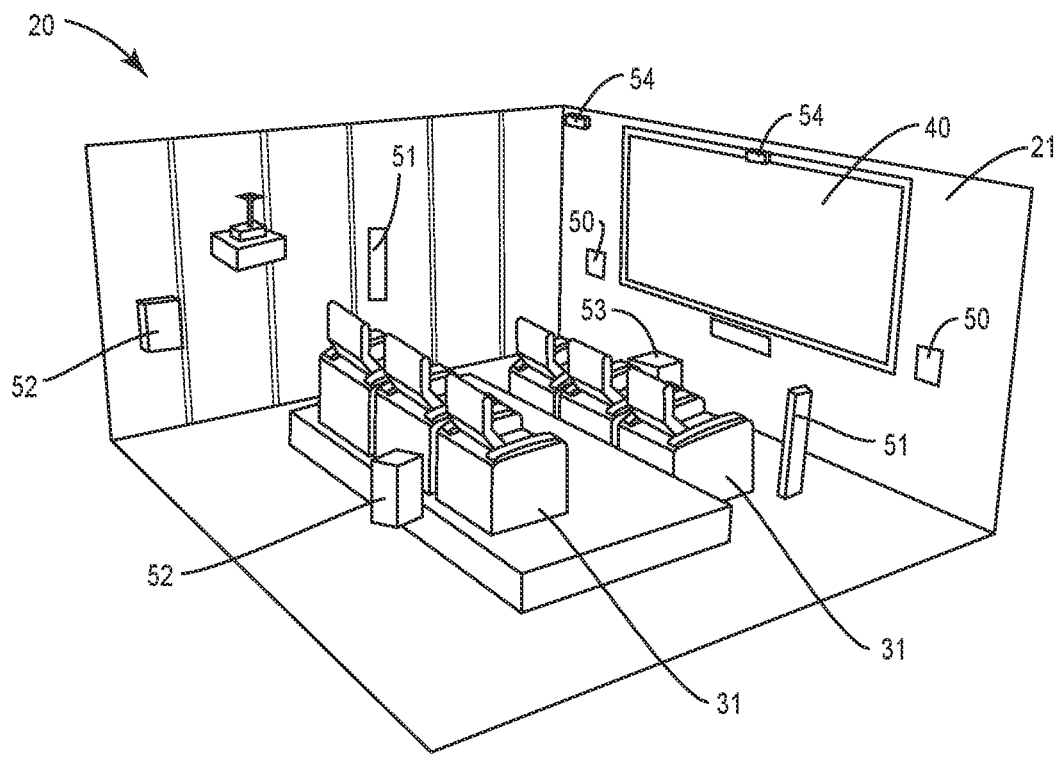
FIG. 13A-13C are perspective views of a room with the components adjusted based on one or more user inputs.

FIG. 13A illustrates a room 20 generated by the server 100 and having a first layout. The positioning of the various components is based on one or more inputs received by the server 100. The room 20 includes the rows 31 of seats 30 positioned a first distance away from the front wall 21. The server 100 calculates the placement of the speakers 50, 51, 52, 53, 54.

Figure 13B:
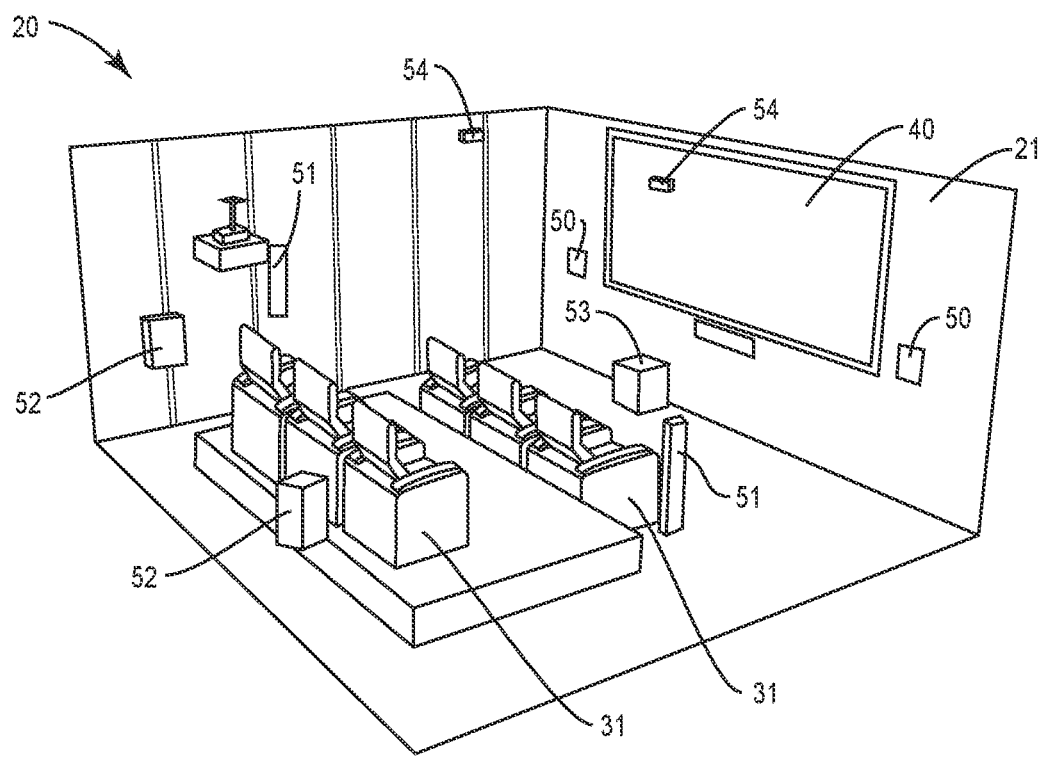

FIG. 13B illustrates an updated room 20 based on one or more inputs from the user that change the configuration. In this example, the user input positions the rows 31 farther away from the front wall 21. The server 100 receives the input of the change in positioning of the rows 31 and calculates the new positioning for each of the components. The new layout for the room 20 is generated by the server 100 for display by the user. As seen in the comparison of FIGS. 13A and 13B, the change in the positioning of the rows 31 causes noticeable changes in the positioning of the side speakers 51 and the ceiling speakers 54.

Figure 13C:
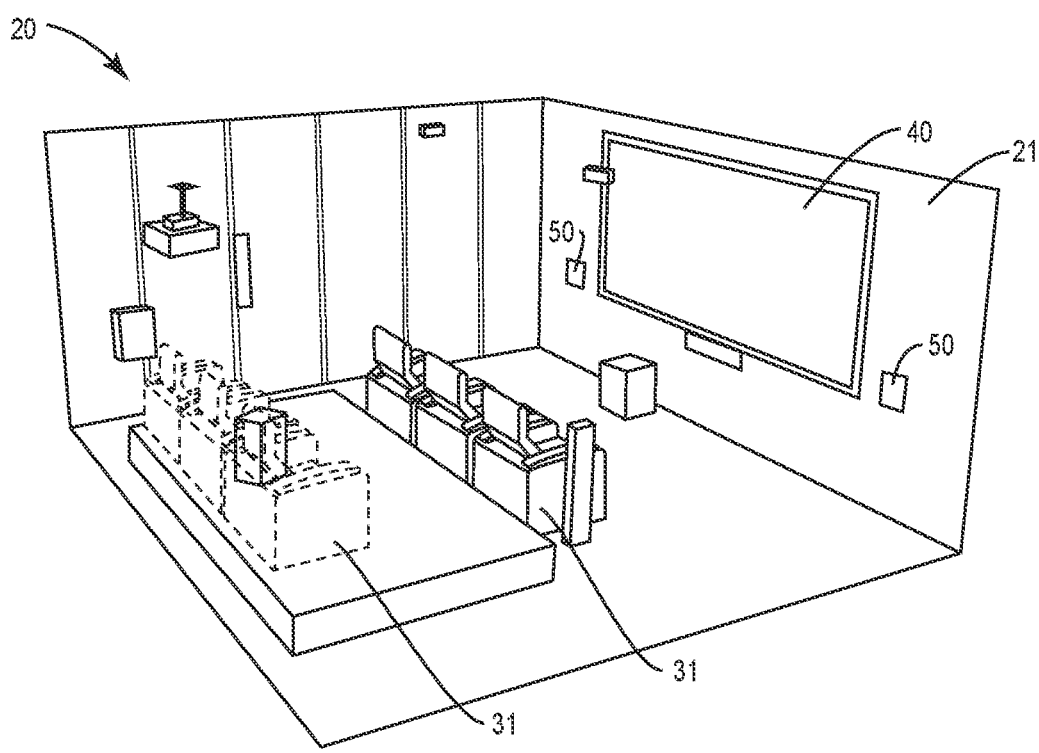

The server 100 recalculates the positioning of the various components in the room 20 based on the one or more new inputs. In the event that the user attempts to position a component at a location that is outside of a rule, the server 100 notifies the user of the rule. FIG. 13C illustrates an example of a notification that includes an error message generated by the server 100 in response to receiving one or more inputs that violate one or more rules. In this example, the received input attempts to position the back row 31 too far away from the screen 40. This position would result in one or more of the rules being out of range. In this specific example, the server 100 generates an image that highlights the one or more components that are in violation (e.g., the rows 31 are highlighted to show non-compliance). One or more error messages can also be generated to be displayed that describe the one or more rule violations. In one example, the error message includes a description of the error (e.g., back row 31 too far from screen 40) and a description of how to correct the error.

In one example, the server 100 generates an image with the one or more components at the violated position. In another example, the server 100 positions the one or more violating components at the maximum allowable position according to the one or more rules but does not generate an image with the component at the calculated position based on the one or more inputs. For example, if the server 100 receives an input to position a back row 31 within six (6) inches of the back wall 22 but a rule prevents placement closer than twelve (12) inches, the server 100 generates an image of the room 20 with the back row 31 at the inputted position.

The server 100 calculates the positioning of the various components. The calculations can be based on independently positioning each of the components regardless of the other components. The server 100 can also calculate the position based on their inter-relatedness with other components in the room 20. For example, the positioning of the rear speakers 52 is set based on whether there are side speakers 51. The positioning of the ceiling speakers 54 is based on the number of rows 31 of seats 30. This inter-relatedness of components provides for the server 100 to calculate an accurate representation of the mastered audio content.

Figure 14:
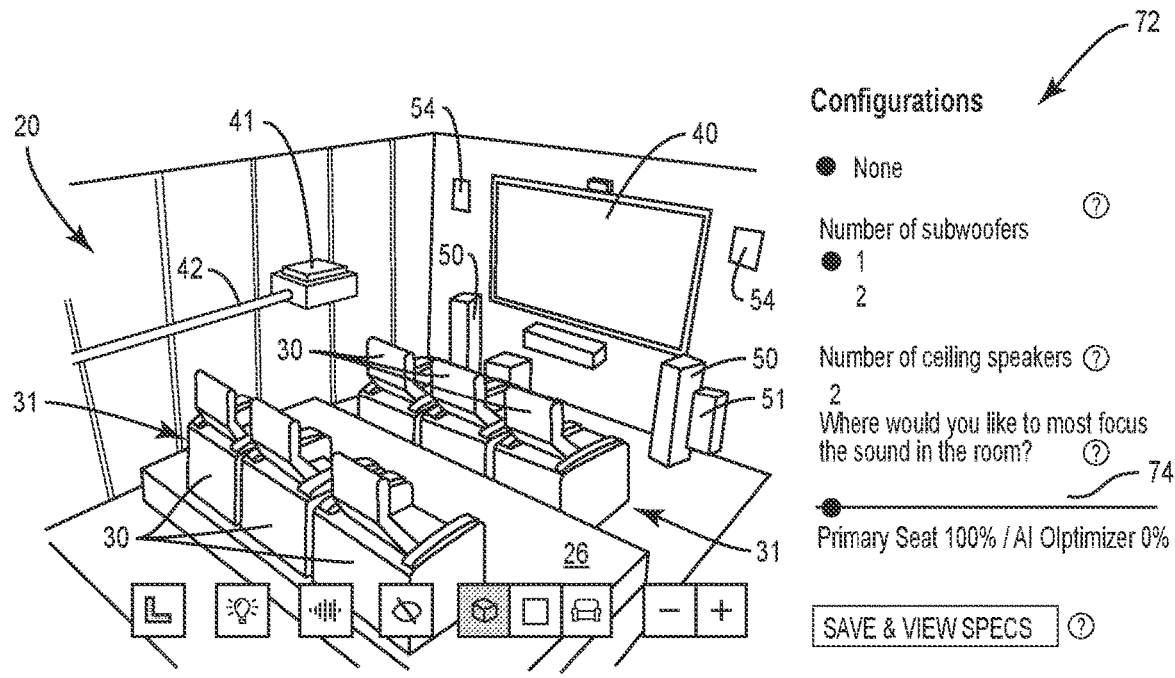
FIG. 14 is a display generated by a server with the display having an input section with an audio selection input.

The server 100 calculates the audio aspects of the room 20 based on an audio selection input from the user. As illustrated in FIG. 14, the input section 72 includes an audio selection input 76 for generating the desired sound output for the user. The audio selection input 76 provides for a selection between a focus on a selected seat (i.e., 100% primary seat) and a more general setting that provides focused audio to each of the seats 30 in the room 20 shown as 100% AI Optimizer (i.e., 100% optimizer). The audio selection input 76 can also include intermediate selections that provide for various combinations between the two settings (e.g., 80% primary seat and 20% optimizer; 60% primary seat and 40% optimizer). In one example as illustrated in FIG. 14, the audio selection input 76 is a sliding bar that provides for adjusting between the two outer settings.

The selection of 100% for the primary seat provides for less optimized audio for the other seats 30 in the room 20. The selection of 100% optimizer provides for the same or similar audio for each of the seats 30 in the room 20. In one example, 100% optimizer provides the highest average audio experience across the seats 30. In one example of 100% optimizer, seats 30 in the center of the one or more rows 31 have better audio than the outer seats away from the center.

Figure 15:
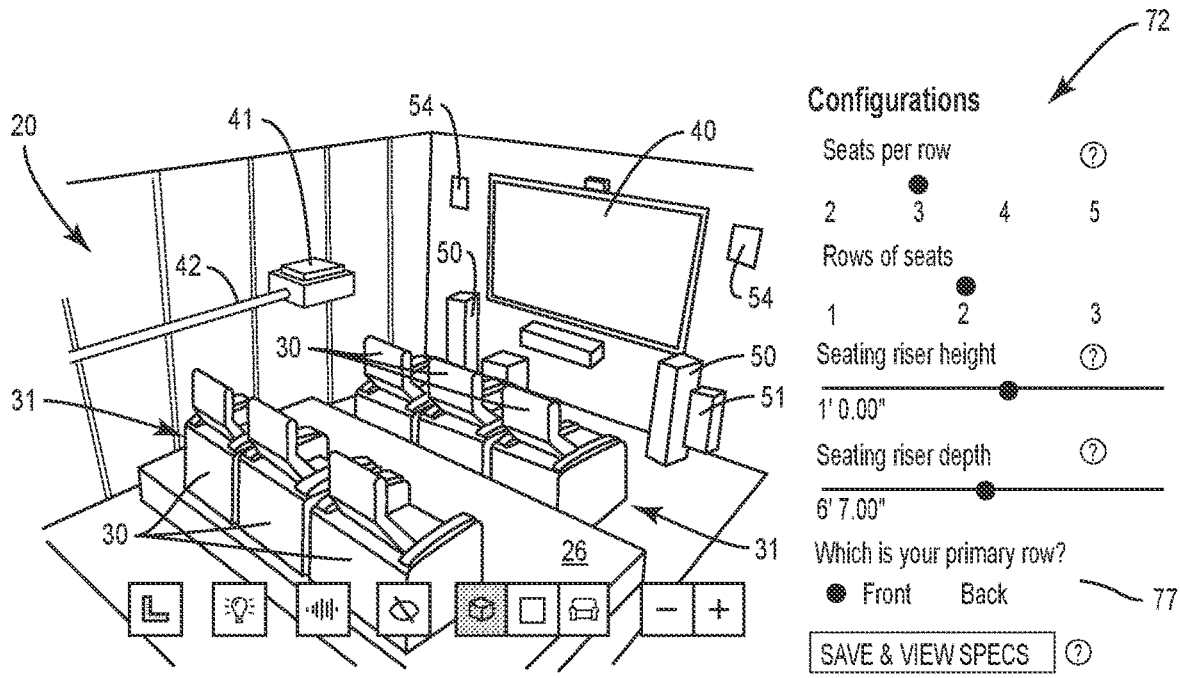
FIG. 15 is a display generated by a server with the display having an input section with a row selection input.

The 100% primary seat setting (i.e., 100% primary seat) provides for the sound to be optimized at the primary seat 30. The selected seat 30 can be selected by the user through the input section 72. In one example as illustrated in FIG. 15, the input section 72 includes a row selection input 77 that provides for a user to input the row 31 where the primary seat 30 is located. The server 100 uses a middle seat of the primary row for the selected seat 30. In rows 31 with an even number of seats 30, the primary seat 30 is located between the two middle seats 30. In another example, the row selection input 77 provides for the user to input the specific seat 30 that is the primary seat 30.

Figure 16:
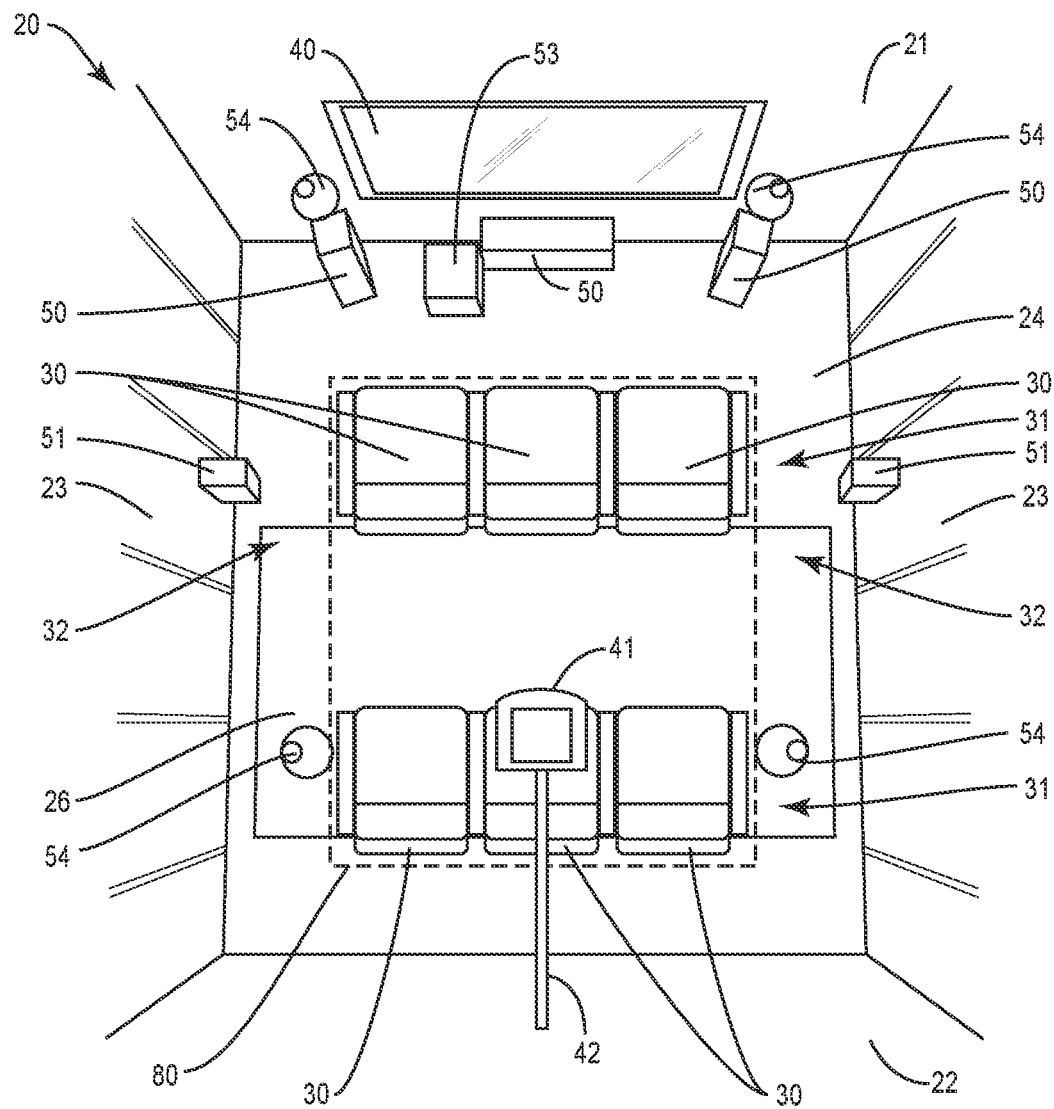
FIG. 16 is a top view of a display generated by a server with an outline of a seat zone extending around the seats.

The calculations for the placement of the speakers can include one or more constraints. One constraint is a wall constraint that the ceiling speakers 54 are not placed within a predetermined distance from the front wall 21, back wall 22, and side walls 23 as illustrated in FIG. 16. This predetermined distance provides for adequate space to accommodate the speaker 54 without abutting against a wall 21, 22, 23. For example, a ceiling speaker 54 has a diameter of fourteen inches (14") and the predetermined wall constraint is at least seven inches (7"). In one specific example, the predetermined distance is fourteen (14) inches. In one example, the wall constraint applies to each of the audio selections (i.e., each of 100% primary seat, 100% optimizer, and various intermediate selections).

Another constraint is a seat constraint that the ceiling speakers 54 should not be placed inside of a seat zone 80 defined by the outer edges of the seats 30. FIG. 16 includes an example of a seat zone 80 defined by the outer edges of the seats 30 of the two rows 30. The seat zone 80 is defined along the left-most edges of the left-most seats 30, the right-most edges of the right-most seats 30, the front-most edges of the front-most seats 30, and the rear-most edges of the rear-most seats 30. The seat constraint includes that the various speakers including the ceiling speakers 54 are positioned outside of the seat zone 80. In one example, the seat constraint applies to just the 100% optimizer selection and does not apply to other selections.

Figure 17:
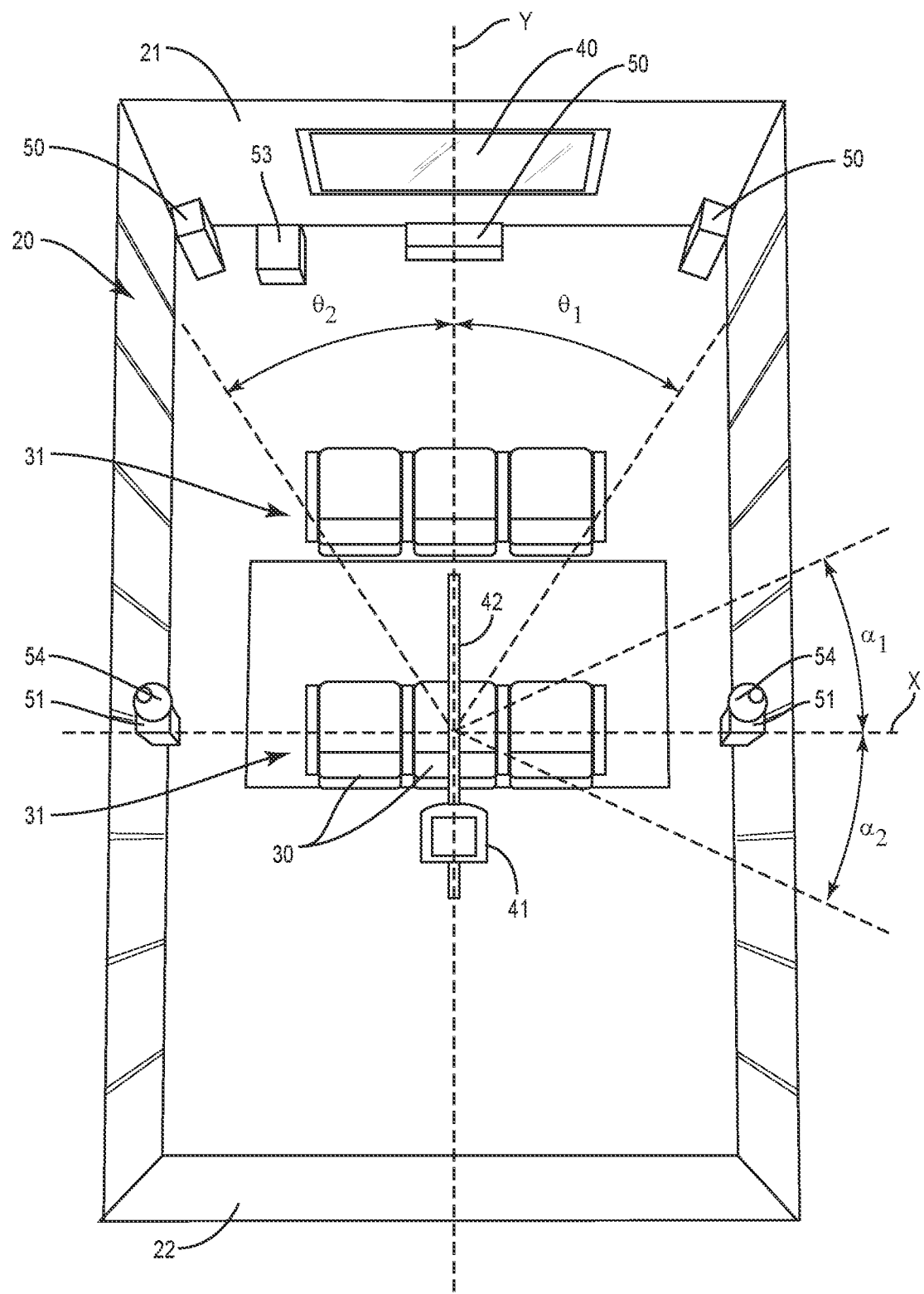
FIG. 17 is a top view of a display generated by a server with angular positioning for speakers relative to a primary seat.

In one example, the ceiling speakers 54 are positioned relative to the primary row 31. FIG. 17 includes an example in which the primary row is the back row 31. A first baseline X extends across the width W of the room 20 and through the seats 30 of the primary row 31. The server 100 determines angles $\alpha_1$, $\alpha_2$ which are forward and rearward from the first baseline X. The server 100 also determines angles $\theta_1$, $\theta_2$ which are formed from a second baseline Y that extends across the depth D of the room 20 and through the primary seat 30. In one example, the first baseline X is parallel to one or both of the front wall 21 and the back wall 22. In one example, the second baseline Y is perpendicular to one or both of the front wall 21 and the back wall 22. In one example, the first baseline X is perpendicular to the second baseline Y.

The number and arrangement of the speakers in the room 20 can vary. In one example (e/g., FIGS. 13A-C), the room 20 includes front speakers 50, side speakers 51, rear speakers 52, and ceiling speakers 54. Various examples can include various numbers and combinations of these speakers. The various combinations can also include or exclude the one or more subwoofers 53.

Figure 18:
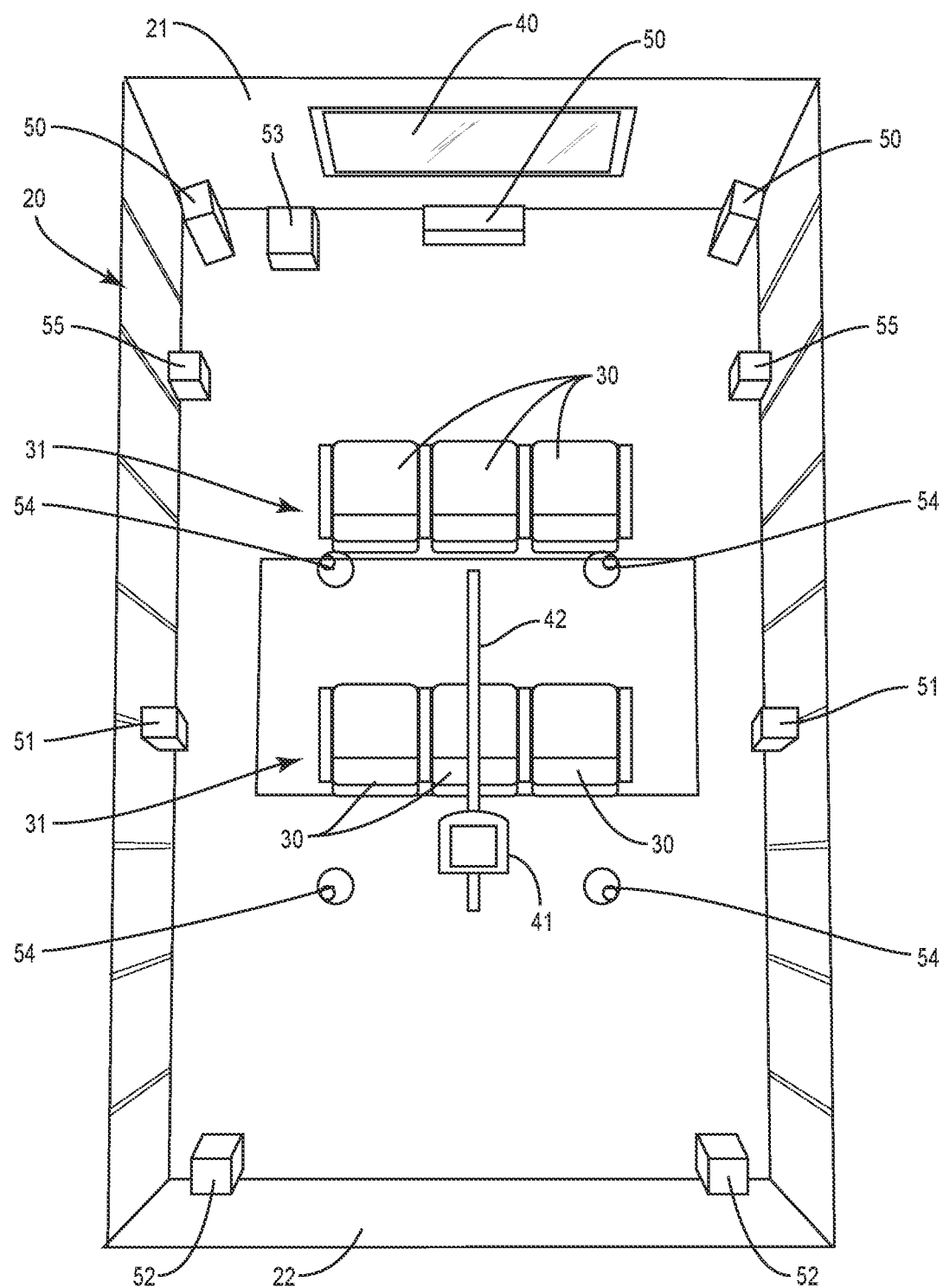
FIG. 18 is a top view of a display generated by a server.

The speakers can also include wide speakers 55 as illustrated in FIG. 18. The wide speakers 55 are positioned at the lateral sides 23 of the room 20 between the front speakers 50 and the side speakers 51. In one example, the wide speakers 55 are box speakers 55 that are positioned on the floor 54. Another example (e.g, wall mounts) positions the wide speakers 55 in the sidewalls 23 and elevated above the floor 54. In one example, wide speakers 55 are used in more advanced systems. The purpose of the wide speakers 55 is to provide a cohesive sound between the front speakers 50 and the side speakers 51. In one example, the audio of a car or plane coming from the front wall 21 to the back wall 22 would start at the front speakers 50 and then transition through the wide speakers 55 and then through the side speakers 51. The server 100 can also be configured for the sound to continue through to the rear speakers 52.

The position of the wide speakers 55 is between the front speakers 50 and side speakers 51. One placement calculates a first geometric configuration that includes a straight line between the front right speaker 50 and the right side speaker 51. A midpoint is determined for the line. A straight line is then drawn from the primary seat 30 through the midpoint and to the side wall 24. The placement of the wide speaker 55 is the location where the straight line intersects with the side wall 24. This determination is made for both wide speakers 55 on the opposing lateral sides of the room 20.

Another placement calculates, for each lateral side of the room 20, the angle formed between the front speaker 50 and the side speaker 51. This angle is bisected into two equal angles by a dividing line. The dividing line is then extended until intersecting with the side wall 23 of the room 20. This intersection point is the location for the wide speaker 55.

The calculations for placement of the wide speakers 55 can use either of these calculations. In another example, an average is calculated between the two calculations. In one example, the first calculation is effective to place the wide speaker 55 halfway between the front speaker 50 and the side speaker 51. The second calculation is effective in placing the wide speaker 55 at the midpoint of the angle. An average of the placements determined by these two calculations provides for a location to fill the sound gap between the front speaker 50 and the side speaker 51.

FIGS. 19A and 19B include data saved in the memory circuitry 105 and used by the server 100 for determining the positions of speakers with an audio selection input 76 of 100% primary seat. The table provides for the positioning of the various speakers depending upon the number of rows 31 of seats and the primary row 30 where the primary seat 30 is positioned. For the various configurations, the position of the side speakers 51 is six (6) inches in front of the baseline X (i.e., main less 6"). The height of the side speakers 51 is fifty inches (50") above the height of primary seat (i.e., 50" over the main listening position (MLP) riser). The positioning of the front speakers 50 and the rear speakers 52 is the same as disclosed above.

The positioning of the wide speakers 55 uses one of the calculations disclosed above. The positioning of the various pairs of ceiling speakers 54 are determined based on the angles $\alpha$ and $\theta$. With three pairs of ceiling speakers 54, the middle pair is positioned at a midpoint between the front and back pair.

The placement of the ceiling speakers further includes the wall constraint but does not include the seat constraint. The wall constraint ensures that there is adequate space for positioning the speakers 54 on the ceiling 25. The seat constraint is not applicable because the audio selection input 76 of 100% primary seat focuses on the primary seat 30 to the audio detriment of the other seats 30.

FIGS. 20A and 20B include the data saved and used by the server 100 to determine the layout for a 100% optimizer selection. This determination depends upon the number of rows 31 of seats 30 and the primary row 30. The positioning of the front speakers 50, side speakers 51, rear speakers 52, and wide speakers 55 is based on one or more variables of the layout of the room 20. The positioning of the various pairs of ceiling speakers 54 is determined based on the angles α and θ. For examples with three pairs of ceiling speakers 54, the middle pair are positioned at a midpoint between the front and back pairs of ceiling speakers 54.

The placement of the speakers for the 100% optimizer includes both the wall constraint and the seat constraint. The seat constraint provides for the ceiling speakers 54 to be outside of a seat zone 80 defined by the seats 30.

The server 100 is further configured to determine one or more intermediate positions for the output of the sound in the room 20. These intermediate positions are between the 100% primary seat selection and the 100% optimizer selection. The number of incremental intermediate positions can vary. One example includes increments of 10% between the outer settings. Another example includes 5% between outer settings.

The server 100 calculates the intermediate positions based on incremental differences between the outer settings (i.e., the primary seat 100% and optimizer 100%). For each speaker, the server 100 calculates the positions at the two outer settings and determines a distance between the two positions. The positions of each of the speakers is then determined based on the starting points and an incremental distance equal to a corresponding increment of the distance between the two positions. The direction of the movement is determined based on a line between the two outer positions. For example, a first ceiling speaker moves five feet (5') along a line between the two outer settings (i.e., between the primary seat 100% and the optimizer 100% settings). An incremental position that is 20% different than the first setting A moves the speaker along the line by one foot (1') (i.e., 20% of 5'=1').

Figure 21A:
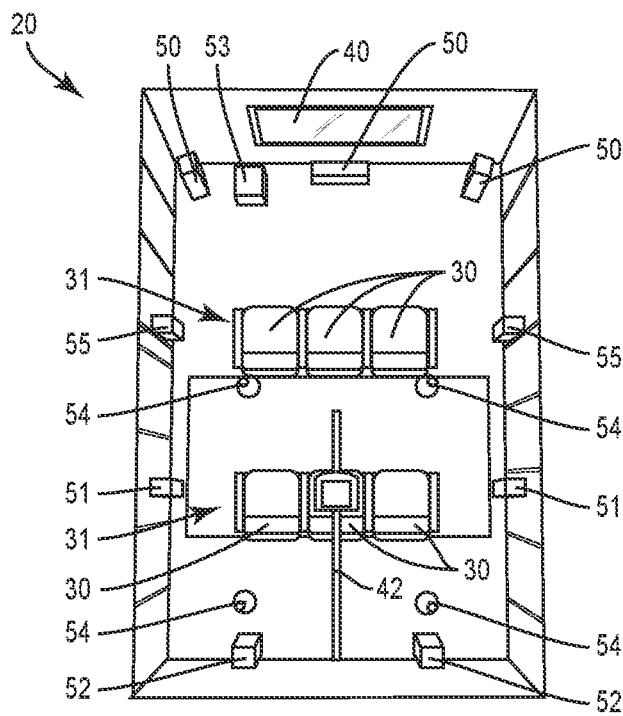
FIGS. 21A-21E are top views of displays generated by a server of speakers positioned in a room with different audio selection inputs.
Figure 21B:
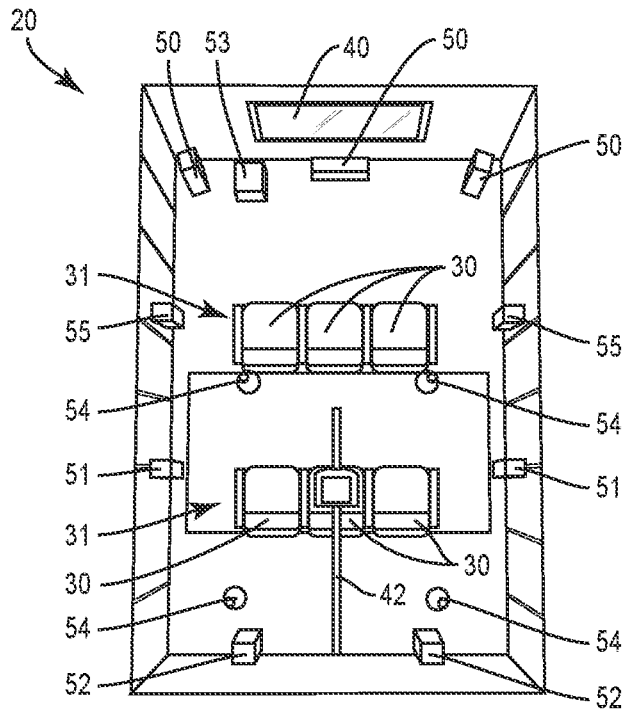
Figure 21C:
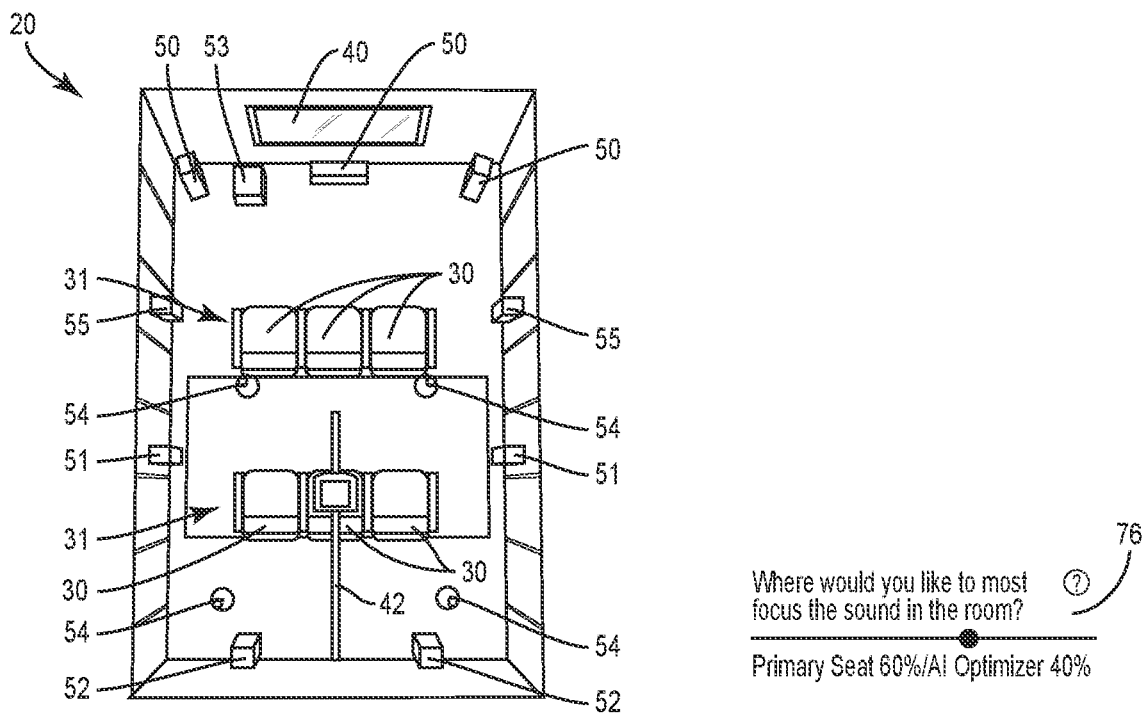
Figure 21D:
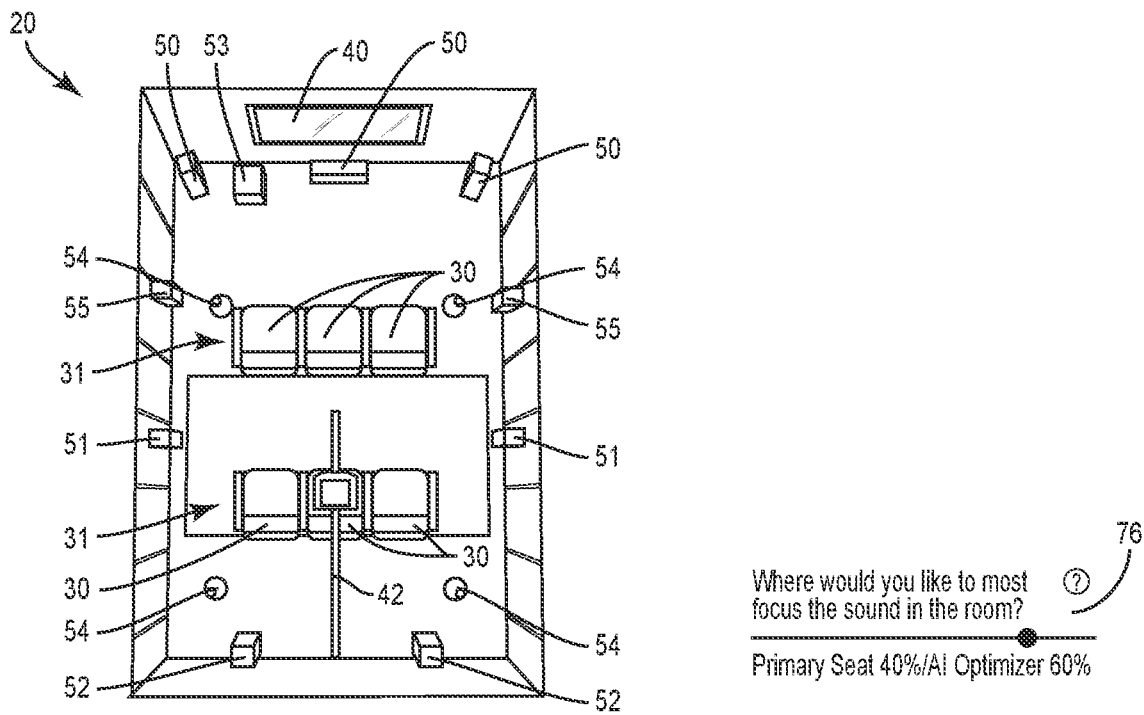
Figure 21E:
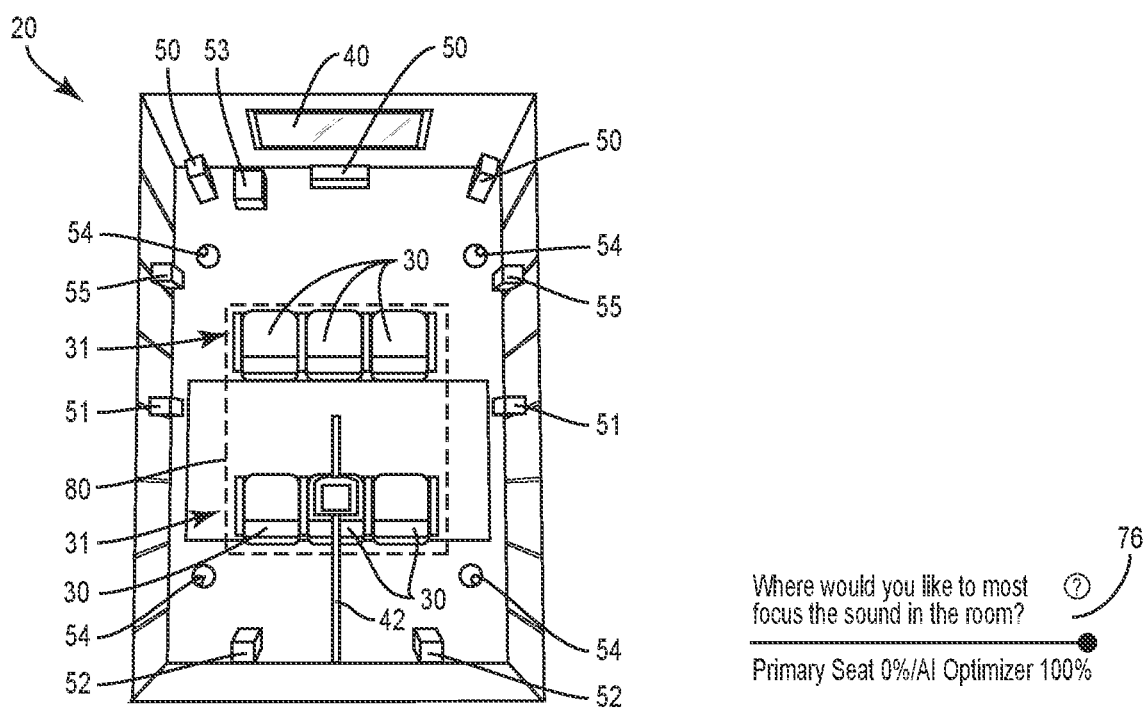

FIGS. 21A-21E illustrate the display of a room 20 at different acoustic settings between a 100% primary seat (FIG. 21A) and a 100% optimizer (FIG. 21E). In this example, the room 20 includes front and back rows 31 of seats 30 with the back row 31 being the primary row. The back row 31 includes three seats 30 with the middle seat being the primary seat 30. The room 20 also includes front speakers 50, side speakers 51, rear speakers 52, a subwoofer 53, two pairs of ceiling speakers 54, and wide speakers 55. This example includes the intermediate positions at 20% increments.

FIG. 21A illustrates a display of a room 20 generated by the server 100 with the audio selection input 76 of primary seat 100%. The positions of the speakers are determined for the primary seat 30 to have the highest audio experience in the room 20.

FIG. 21B illustrates a room display with a hybrid setting for the audio selection input of 80% primary seat and 20% optimizer. FIG. 21C illustrates a room display with a hybrid configuration of 60% primary seat and 40% optimizer. FIG. 21D includes a hybrid configuration with 40% primary seat and 60% optimizer. FIG. 21E includes a 100% optimizer display. In the changes between the different configurations, one or more of the speakers remains in the same position such as the front speakers 50 and rear speakers 52. One or more of the other speakers changes positions between the configurations, including the ceiling speakers 54, side speakers 51, and wide speakers 55.

As illustrated in FIG. 21E with the 100% optimizer, the speakers are each positioned outside of the seat zone 80. This positioning provides for distributing the sound to each of the seats 30 in the seating arrangement. In one example, the 100% optimizer configuration optimizes the average audio experience across all the seats 30.

In one example, the server 100 determines whether each of the speakers are within the specifications at the different displayed configurations. The specifications can include the rules such as those saved in the rule set saved in the memory circuitry 105. Additionally or alternatively, the specification for each speaker can include a setting defined by a surround sound processing format, such as Dolby Atmos or DTS. These settings are saved in the memory circuitry 105 and accessed by the server 100 for the calculations. When the speaker is within the specification, the server 100 displays the speaker in a first manner with a first visual appearance. When the speaker is determined to be out of specification, the server 100 displays the speaker in a second manner with a different second visual appearance. FIG. 21E illustrates an example in which the front ceiling speakers 54 are determined to be out of specification at the 100% optimizer setting. The front ceiling speakers 54 are displayed in a different visual manner than other speakers that are within their specification (e.g., the back ceiling speakers 54). This visual representation provides for a user to visually see the issue and adjust the positioning as necessary. Additionally or alternatively, an indication such as a statement is displayed to further indicate the speaker(s) that are out of specification.

FIGS. 22A-22E illustrate an example of audio experience levels for each seat 30 at different settings of the audio selection input 76. This example includes a room with three seats 30 in each of two rows 31. The middle seat 30 in the back row 31 is the primary seat. The scores shown in FIGS. 22A-22E represent the percentage of accuracy of the audio experience to what was originally encoded in the audio stream of the content. For example, a score of 99 indicates a listener in the seat 30 experiences 99% of the intended audio experience, a score of 75 indicates a 75% experience of the intended audio experience, etc.

In one example, the audio experience level of the primary seat 30 at this setting is the highest obtainable level for the audio system. For example, a score of 99 is the highest possible level. In another example, the audio experience level of the primary seat at this setting is below the highest possible level (e.g., a score of 97 out of a possible 100).

Figure 22A:
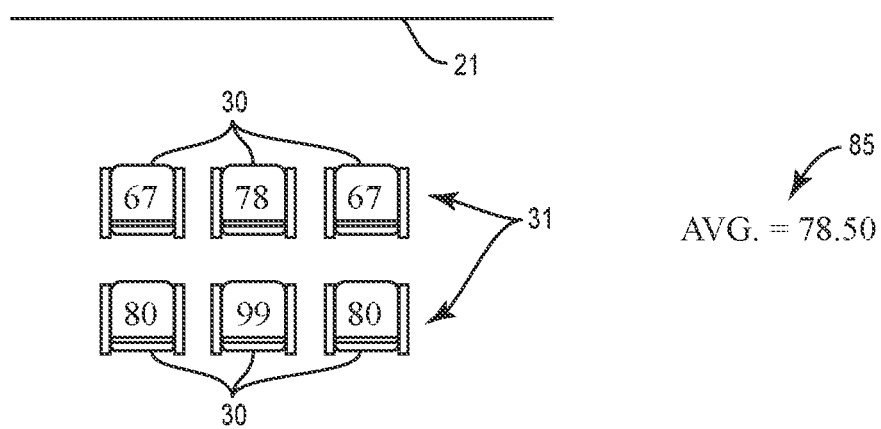
FIGS. 22A-22E are top schematic views of rows of seats with the seats having different audio experience levels at different audio selection inputs.

FIG. 22A illustrates the audio experience levels for each seat 30 for a setting at 100% primary seat. The primary seat (i.e., back middle seat 30) has the highest audio experience level. The other seats 30 have lower audio experience levels as the focus of this audio selection input 76 is to emphasize the experience for the primary seat 30. In one example, the primary seat 30 has as close to the original recording as possible in this setting. In the illustrated example, a listener in the primary seat 30 has 99% of the intended experience.

Figure 22B:
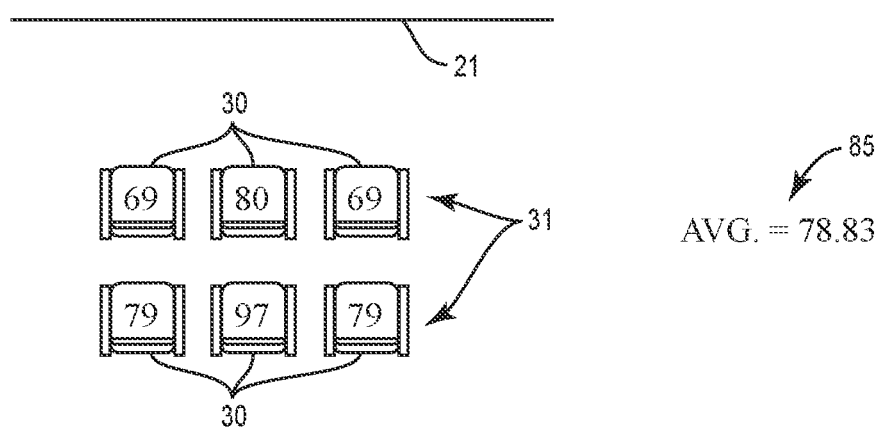

FIG. 22B illustrates an audio selection input 76 at 80% primary seat and 20% optimizer. The audio experience level of the primary seat 30 has been reduced and the levels at the other seats has increased. This change is caused as this input 76 starts to distribute the audio away from the primary seat 30 to the other seats 30 in the room.

Figure 22C:
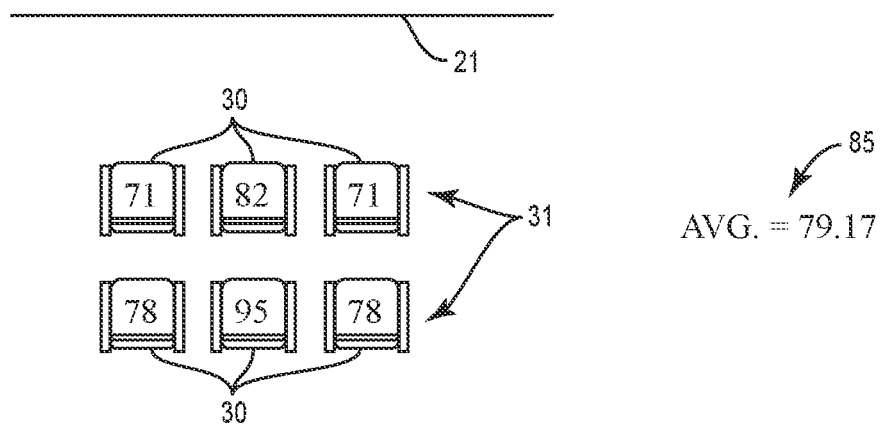
Figure 22D:
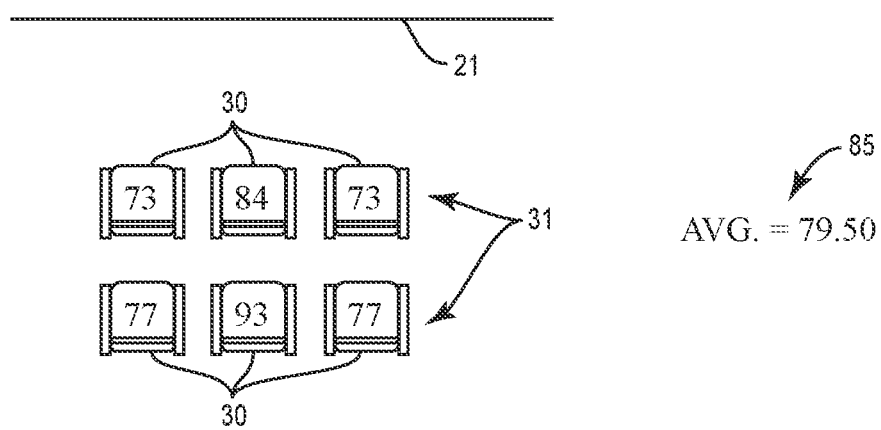

FIG. 22C illustrates an audio selection input 76 of 60% primary seat and 40% optimizer. FIG. 22D illustrates an audio selection input 76 of 40% primary seat and 60% optimizer. At both selections, the level is reduced at the primary seat 30 and increased at the other seats 30.

Figure 22E:
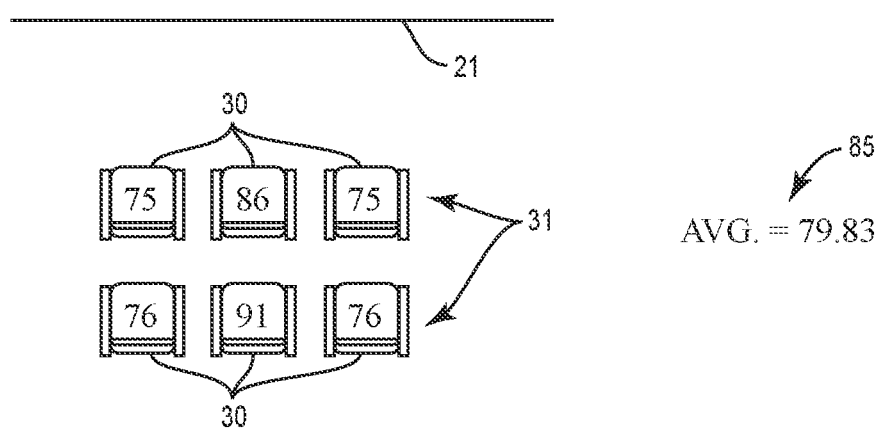

FIG. 22E includes an audio selection input 76 of 0% primary seat and 100% optimizer. This setting distributes the sound throughout the room 20. In this example, the primary seat 30 still has the highest audio experience level at this setting 76.

Each of the different settings includes an average audio experience level 85 for the seats 30. The average 85 is determined by summing the score for each set and dividing the sum by the number of seats 30. As illustrated, the average audio experience levels 85 increase from the audio selection input 76 of 100% primary seat (as illustrated in FIG. 22A) to the 100% optimizer (as illustrated in FIG. 22E).

In the example of FIGS. 22A-22E, the primary seat 30 has the best audio experience in each of the settings. Further, the middle seats 30 in the rows 31 have a better audio experience than the side seats 30.

Figure 23:
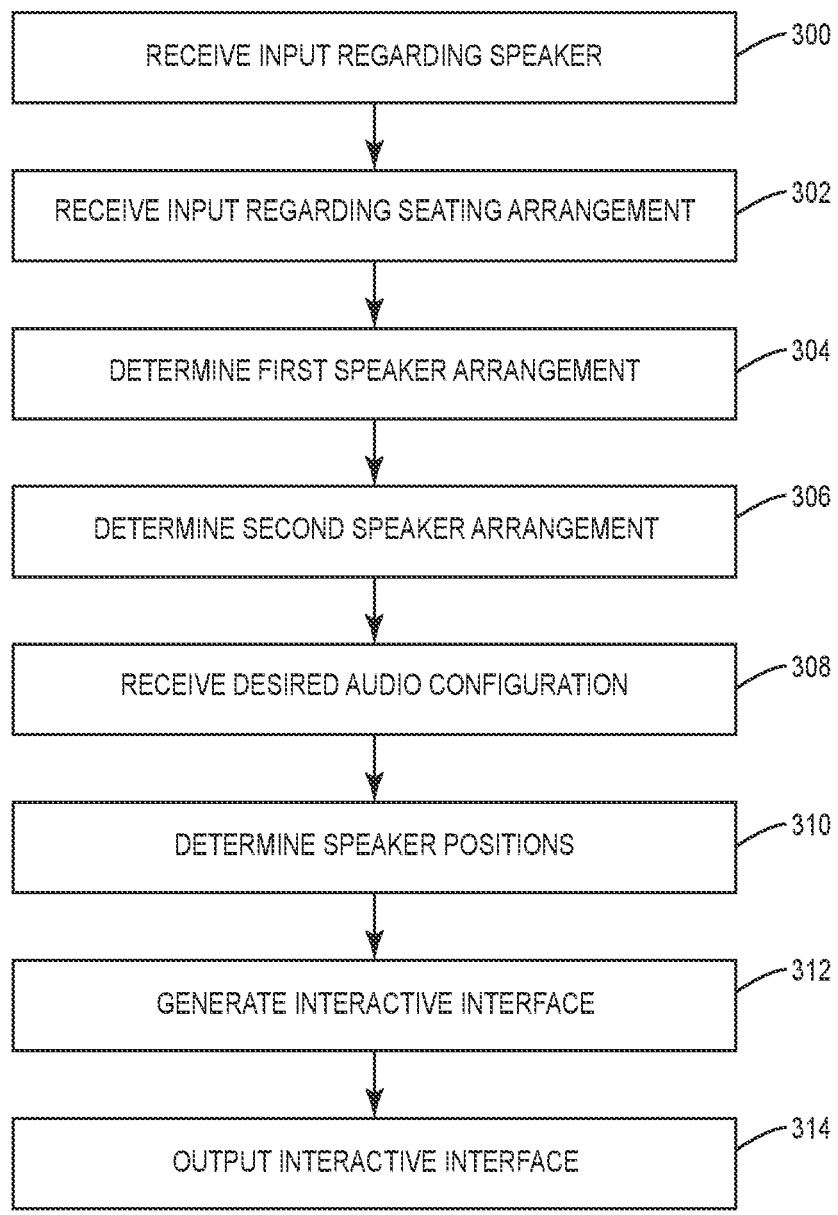
FIG. 23 is a flowchart diagram of a method of generating an interactive graphical user interface that represents a room for viewing on a user device.

FIG. 23 illustrates a method of generating an interactive graphical user interface that represents a room for viewing on a user device. The method includes receiving an input regarding the speakers (block 300). The input can include one or more of the number of speakers, type of speakers, and the basic position of the speakers (e.g., front speakers, rear speakers, ceiling speakers). An input is also received regarding the seat arrangement (block 302). The inputs can include one or more of the number of seats 30, the number of rows 31 of seats 30, and the primary seat 30. A first speaker arrangement with a first audio output is determined (block 304). In one example, the first speaker arrangement includes a primary seat configuration that provides for a higher level of audio at the primary seat 30 than at a remainder of the seats 30. The method also determines a second speaker arrangement (block 306). In one example, the second speaker arrangement is an optimizer configuration that provides for the audio to be more evenly distributed throughout the seat arrangement. An audio selection input is received indicating a desired audio configuration for the room 20 (block 308). The method determines selected positions for the speakers within the room 20 based on the audio selection input (block 310). An interactive graphical user interface is generated that represents the room 20 and comprises the speakers at the selected positions and the seat arrangement (block 312). The graphical user interface is output to a display of a user device 160 (block 314). The aspects disclosed in FIG. 23 can be performed in other sequences than those illustrated. For example, receiving an input regarding the seat arrangement (block 302) can happen before or after determining a first speaker arrangement with a first audio output (block 304).

Figure 24:
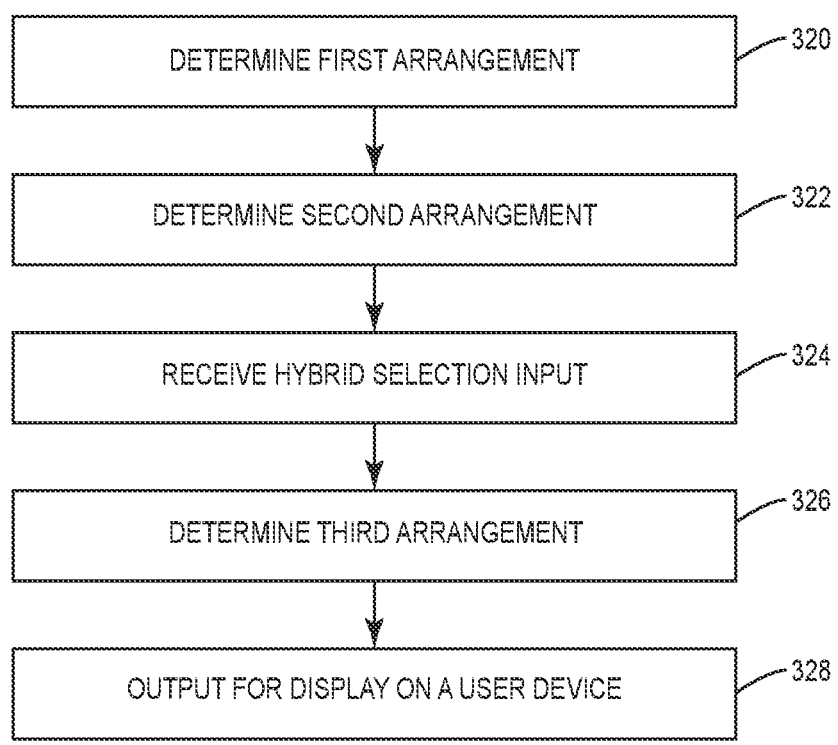
FIG. 24 is a flowchart diagram of a method of generating an interactive graphical user interface that represents a room for viewing on a user device.

FIG. 24 illustrates another method of generating an interactive graphical user interface that represents a room for viewing on a user device. The method includes determining a first arrangement of speakers within the room that provides for a higher audio level at a primary seat than at a remainder of seats (block 320) and a second arrangement of the speakers that provides for the audio to be distributed throughout a seat arrangement (block 322). The different speaker arrangements have different outputs for the various seats in the seat arrangement. The method includes receiving from the user device a hybrid audio selection input (block 324). The positioning determination interpolates between the first positions and the second positions to determine a third arrangement of the speakers (block 3266). The third arrangement is output for display on a user device 160 (block 328).

Figure 25:
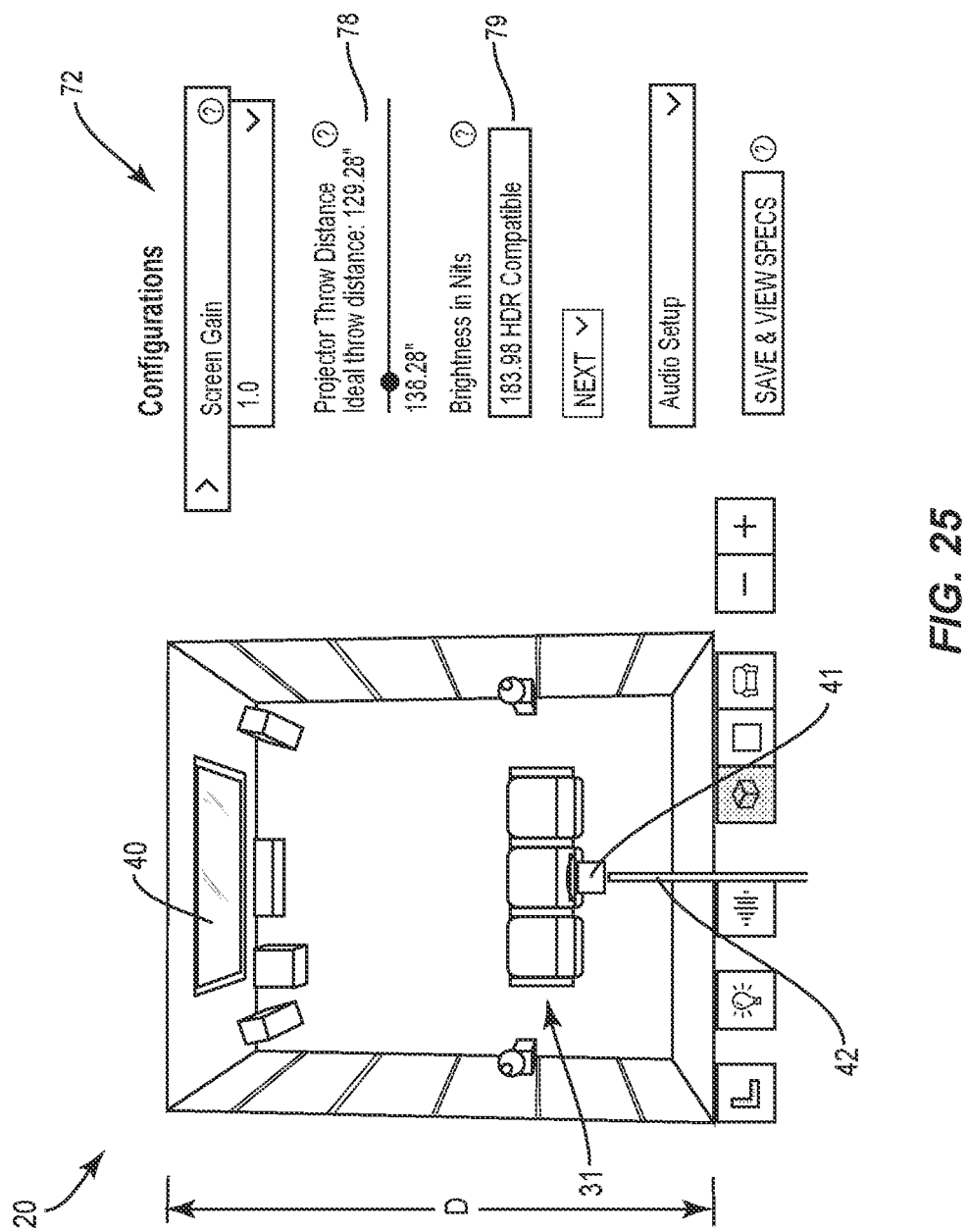
FIG. 25 is a top view of a display generated by a server with an input section having an input for a projector position and a corresponding brightness indicator.

The server 100 is further configured to display a position of the projector 41 along the depth D of the room 20. As illustrated in FIG. 25, the generated display includes the input section 72 that includes a video setup section. The video setup options include the selection of a projector and a projector throw distance input 78 which is constrained by the shortest and longest distance the projector 41 can be from the front wall 21. This input 78 provides for adjusting the location of the projector 41 along the depth D of the room. The section 72 also includes a brightness output (in nits) 79 that corresponds to the location of the projector 41. The server 100 calculates the brightness output based on the location. The display includes an adjustment line 42 along which the projector 41 can be positioned by the user.

The server 100 is configured to generate an interactive graphical user interface that represents a room 20 that is output for display. The processing circuitry 103 can perform the speaker positioning calculations based on instructions and/or data stored in the memory circuitry 105.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating an interactive graphical user interface that represents a room for viewing on a user device, the method comprising:
   receiving from the user device inputs regarding speakers and a seat arrangement with a primary seat;
   determining a first arrangement of the speakers at a primary seat configuration that provides for a higher level of audio at the primary seat than at a remainder of the seats;
   determining a second arrangement of the speakers at an optimizer configuration that provides for the audio to achieve a highest average level across the seats;
   receiving from the user device an audio selection input of a desired audio configuration for the room;
   determining selected positions for the speakers within the room based on the audio selection input;
   generating an interactive graphical user interface that represents the room and comprises the speakers at the selected positions and the seat arrangement; and
   outputting the graphical user interface to a display of a user device.

2. The method of claim 1, further comprising optimizing the audio at the primary seat in the primary seat configuration.

3. The method of claim 1, further comprising positioning side speakers a predetermined distance in front of the primary seat in the primary seat configuration.

4. The method of claim 1, further comprising determining a seat zone that extends around a perimeter of the seats and positioning the speakers outside of the seat zone in the optimized configuration.

5. The method of claim 1, further comprising:
   receiving the user input comprising a hybrid configuration between the primary seat configuration and the optimizer configuration;

determining the selected positions for the speakers within the room in a third arrangement of the speakers at the hybrid configuration with the hybrid configuration positioning the speakers between the primary seat configuration and the optimizer configuration;

generating, within the user interface, the graphical user interface that comprises the room layout with the speakers at the selected positions corresponding to the hybrid configuration; and outputting the graphical user interface to a display of a user device.

6. The method of claim 5, further comprising interpolating between the primary seat configuration and the optimizer configuration and determining the selected positions for the speakers within the room in the third arrangement.

7. The method of claim 1, further comprising:
determining one or more of the speakers are out of specification at the selected positions; and
causing the one or more speakers that are out of specification to be displayed in a different visual manner than a remainder of the speakers.

8. The method of claim 1, wherein the graphical user interface that represents the room comprises:
outer walls comprising a front wall, a rear wall, and lateral side walls;
one or more rows of the seats; and
a screen on the front wall.

9. The method of claim 8, wherein the graphical user interface that represents the room comprises:
one or more of the speakers on the front wall;
one or more speakers on the rear wall;
one or more of the speakers on the lateral side walls; and
one or more of the speakers on a ceiling.

10. The method of claim 1, further comprising applying a wall constraint to the speakers and preventing the speakers from being positioned within a predetermined distance from a wall of the room.

11. A method of generating an interactive graphical user interface that represents a room for viewing on a user device, the method comprising:
determining a first arrangement of speakers within the room that provides for a higher audio level at a primary seat than at a remainder of seats and with the first arrangement positioning the speakers at first positions;
determining a second arrangement of the speakers that provides for the audio level to be distributed to achieve a highest average level across the seats with the seat arrangement comprising the primary seat and the remainder of seats and with the second arrangement positioning the speakers at second positions;
receiving from the user device a hybrid audio selection input of a desired audio configuration for the room that comprises a combination of the first arrangement and the second arrangement;
interpolating between the first positions and the second positions and determining a third arrangement of the speakers that positions the speakers at a hybrid position based on the hybrid audio selection input;
generating, within the user interface, a room layout that represents the room and comprises the speakers at the third arrangement; and
outputting the graphical user interface to a display of a user device.

12. The method of claim 11, further comprising in the second arrangement positioning the speakers outside of a seat zone that is defined by outer edges of the seat arrangement.

13. The method of claim 11, further comprising determining the first arrangement of the speakers within the room that provides for a highest audio level at the primary seat and lower audio levels at the remainder of seats.

14. The method of claim 11, further comprising determining the second arrangement of the speakers that provides for the audio to be highest at the primary seat.

15. The method of claim 11, further comprising positioning ceiling speakers farther away from the primary seat in the second arrangement than in the first arrangement.

16. The method of claim 11, further comprising:
determining one or more of the speakers are out of specification at the third arrangement; and
causing the one or more speakers that are out of specification to be displayed in a different manner than a remainder of the speakers that are within the specification.

17. The method of claim 11, wherein the graphical user interface that represents the room comprises:
outer walls of the room comprising a front wall, a rear wall, and lateral side walls;
one or more of the speakers on the front wall;
one or more speakers on the rear wall;
one or more of the speakers on the lateral side walls;
one or more of the speakers on a ceiling;
one or more rows of the seats; and
a screen on the front wall.

18. A server configured to generate an interactive graphical user interface that represents a room, the room comprises a floor, a front wall, a back wall, a ceiling, and a screen mounted to a front wall, the server comprising:
memory circuitry; and
processing circuitry configured to:
determine speakers for providing audio in the room;
determine a seat arrangement that comprises a primary seat;
determine a first arrangement of the speakers at a primary seat configuration that provides for a higher level of audio at the primary seat than at a remainder of the seats;
determine a second arrangement of the speakers at an optimizer configuration that provides for the audio to be optimized to achieve the highest average level across the seats;
determine an audio selection input of a desired audio configuration for the room;
determine selected positions for the speakers within the room based on the audio selection input;
generate an interactive graphical user interface that represents the room and comprises the speakers at the selected positions and the seat arrangement; and
output the graphical user interface to a display of a user device.

19. The server of claim 18, wherein the processing circuitry is further configured to:
determine one or more of the speakers are out of specification at the selected positions; and
cause the one or more speakers that are out of specification to be displayed in a different visual manner than a remainder of the speakers.

* * * * *